US011111590B2

(12) United States Patent
Hryn et al.

(10) Patent No.: US 11,111,590 B2
(45) Date of Patent: Sep. 7, 2021

(54) LITHIUM METAL SYNTHESIS

(71) Applicant: UCHICAGO ARGONNE, LLC, Chicago, IL (US)

(72) Inventors: John N. Hryn, Naperville, IL (US); Patricia Anne Ignacio-deLeon, Westmont, IL (US); Li Tang, Bolingbrook, IL (US); Daniel Yoav Arenas, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 16/134,528

(22) Filed: Sep. 18, 2018

(65) Prior Publication Data

US 2020/0087806 A1     Mar. 19, 2020

(51) Int. Cl.
| | | |
|---|---|---|
| C25C 1/02 | (2006.01) | |
| C25C 7/02 | (2006.01) | |
| H01M 4/04 | (2006.01) | |
| H01M 4/1395 | (2010.01) | |
| C25C 7/04 | (2006.01) | |

(52) U.S. Cl.
CPC .......... *C25C 1/02* (2013.01); *C25C 7/02* (2013.01); *C25C 7/04* (2013.01); *H01M 4/0452* (2013.01); *H01M 4/1395* (2013.01)

(58) Field of Classification Search
CPC ... C25C 1/02; C25C 7/02; C25C 7/04; H01M 4/04552; H01M 4/1395
See application file for complete search history.

(56) References Cited

U.S. PATENT DOCUMENTS

| | | | |
|---|---|---|---|
| 4,849,072 A | 7/1989 | Bowman | |
| 4,973,390 A | 11/1990 | Christini et al. | |
| 5,131,988 A | 7/1992 | Peterson | |
| 7,550,028 B2 | 6/2009 | Riquet et al. | |
| 8,652,690 B2 | 2/2014 | Nunome et al. | |
| 8,741,150 B2 | 6/2014 | Chung et al. | |
| 2002/0018935 A1* | 2/2002 | Okada ............... | H01M 4/362 429/231.95 |
| 2005/0115841 A1* | 6/2005 | Ozawa ............... | C25B 1/04 205/638 |
| 2007/0062336 A1 | 3/2007 | Riquet et al. | |
| 2009/0263707 A1* | 10/2009 | Buckley ............. | H01M 4/485 429/94 |
| 2010/0140175 A1 | 6/2010 | Wyse et al. | |
| 2012/0100056 A1 | 4/2012 | Harrison et al. | |
| 2012/0301774 A1* | 11/2012 | Jiang ................. | H01M 2/145 429/144 |
| 2014/0199577 A1* | 7/2014 | Bhavaraju .......... | C25B 13/04 429/104 |
| 2014/0246307 A1* | 9/2014 | Dadasaheb ........ | C25C 1/12 204/260 |
| 2015/0014184 A1 | 1/2015 | Swonger | |

(Continued)

OTHER PUBLICATIONS

Liang, et al., "Polymer Nanofiber-Guided Uniform Lithium Deposition for Battery Electrodes," Nano Letters 15(5), pp. 2910-2916 (2015).

(Continued)

*Primary Examiner* — Ciel P Contreras
(74) *Attorney, Agent, or Firm* — Foley & Lardner LLP

(57) ABSTRACT

System and methods for producing lithium metal from an anodic half-cell and a cathodic half-cell with a lithium permeable membrane therebetween.

18 Claims, 23 Drawing Sheets

(56) References Cited

U.S. PATENT DOCUMENTS

| | | | |
|---|---|---|---|
| 2015/0132633 A1 | 5/2015 | Joshi | |
| 2015/0197830 A1* | 7/2015 | Chon | C22B 3/42 423/179.5 |
| 2016/0164092 A1 | 6/2016 | Stottlemyer et al. | |
| 2016/0254560 A1 | 9/2016 | Aetukuri et al. | |
| 2016/0351889 A1 | 12/2016 | Swonger et al. | |
| 2017/0025658 A1* | 1/2017 | Shi | C23C 14/24 |
| 2017/0203256 A1 | 7/2017 | Chen et al. | |
| 2019/0334147 A1 | 10/2019 | Hamamoto et al. | |
| 2020/0353426 A1 | 11/2020 | Kawashima et al. | |

OTHER PUBLICATIONS

Qian, et al., "Dendrite-free Li deposition using trace-amounts of water as an electrolyte additive," Nano Energy 15, pp. 135-144, 2015.

Tarascon & Armand, "Issues and challenges facing rechargeable lithium batteries," Nature 414, pp. 359-367 (2001).

Wilson, et al., "Recycling of aluminium-lithium process scrap," Journal de Physique Colloques 48(C3), pp. C3-75-C3-83 (1987).

Zhang & Itoh, "Extraction of metals from municipal solid waste incinerator fly ash by hydrothermal process," Journal of Hazardous Materials 136(3), pp. 663-670 (2006).

Zhang, et al., "Dendrite-free lithium deposition with self-aligned nanorod structure," Nano Letters 14, pp. 6889-6896, 2014.

Zhang, et al., "Dendrite-Free Lithium Deposition with Self-Aligned Nanorod Structure," Nano Letters 14(12), pp. 6889-6896 (2014).

Zheng, et al., "PolymerNanofiber-Guided Uniform Lithium Deposition for Battery Electrodes," Nano Letters 15, pp. 2810-2916, 2015.

Mashtalir, et al., "High-Purity Lithium Metal Films from Aqueous Mineral Solutions," ACS Omega 3(1), pp. 181-187 (2018).

Shah, et al., "3D printing of electrically conductive hybrid organic—inorganic composite materials," Microsystem Technologies, 5 pages (2018).

Munnik, et al., "Recent developments in the synthesis of supported catalysts," Chemical Reviews 115(14), pp. 6687-6718 (2015).

Final Office Action for U.S. Appl. No. 16/134,465, dated Jul. 1, 2021.

* cited by examiner

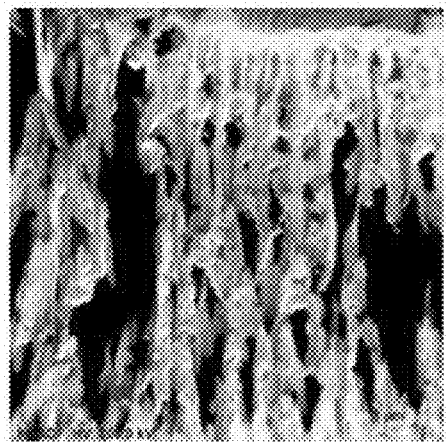 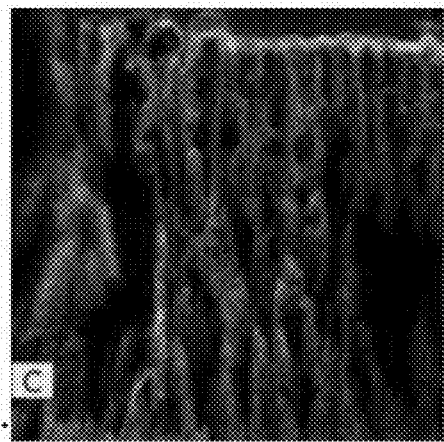
FIG. 15A	FIG. 15B
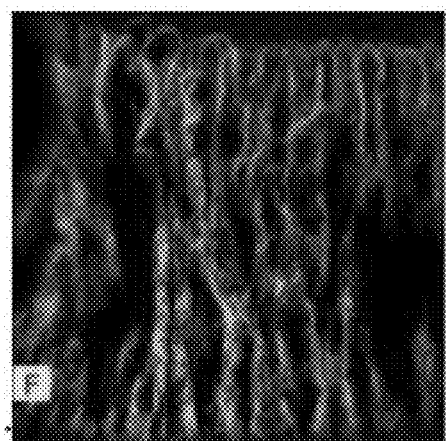 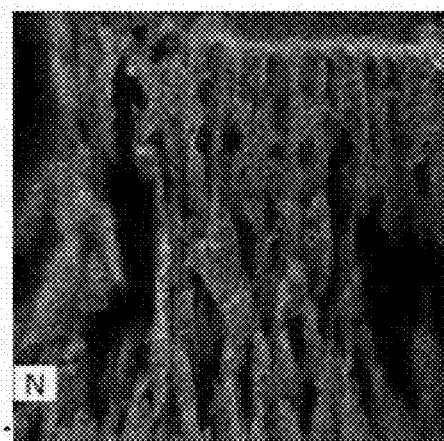
FIG. 15C	FIG. 15D

LITHIUM METAL SYNTHESIS

GOVERNMENT SUPPORT CLAUSE

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to methods for production of lithium. More specifically the present disclosure describes methods for and compositions of lithium produced by electrodeposition.

BACKGROUND

Lithium metal is an attractive material for use as an anode in batteries due to being the lightest and most electropositive metal with a theoretical specific coulometric capacity of 3860 mAh/g, density of 0.59 g/cm$^3$, and negative reduction potential of −3.040V vs. standard hydrogen electrode ("SHE"). Lithium is expected to play an increasingly large role in the energy needs as more consumer demand shifts from petroleum products to electricity. Common Li-ion batteries used for energy storage have a graphite anode and a lithium containing cathode, typically $LiCoO_2$.

However, use of lithium metal as an anode in rechargeable batteries has been plagued by several issues that cause its use to be extremely limited. A limited life cycle is one of the most critical issues with the technology both in terms of cost and feasibility. Most of the issues relate to the formation of dendrites during cycling. During the first few cycles of a cells life a solid-electrolyte interphase ("SEI") is generated at the surface of the anode. The SEI consumes some of the available lithium in its makeup. When dendrites are formed during continued cycling, more and more lithium is consumed in the generation of SEI on the surface of the dendrites, resulting in continued capacity fade. In addition, dendrites can grow long enough to penetrate the separator and short the cell causing immediate failure.

In addition, current production methods for lithium metal involve high temperature electrolysis of a mixture of molten lithium chloride and potassium chloride that is relatively energy intensive. Typically, commercial production of lithium involves forming the metal using lithium chloride as a feedstock in a high temperature reaction vessel. In one process, a ratio of 55% LiCl is mixed with 45% KCl to produce a molten eutectic electrolyte. That material is fused and electrolyzed at about 450° C. This releases the chlorine as a gas, leaving molten lithium, which slags out or rises to the surface of the electrolyte. This requires collecting the lithium in this environment, in particular in a manner to prevent oxidation of the lithium such as by wrapping in paraffin or the like. The resultant lithium material may be presented as bulk material, such as an ingot, or as a foil to be used with a substrate material. However, for the foil usage, it is necessary to laminate or adhere the lithium foil to the substrate as a separate process.

Some researchers have attempted to address the failings of the commercial lithium production process. These process attempted to produce nanostructured lithium (rod/columnar morphology) films on a Cu foil using a commercially available Li metal foil. In one attempt at Tsinghua University (China), galvanostatic deposition was developed in a two-electrode system (Cu, Li foil) using 1M LiTFSI in 1:1 DOL:DME at fixed capacities of 1 mAh/cm$^2$ (at various current densities 0.1, 0.5, 1 and 2 mA/cm$^2$) or at 0.25 and 0.5 mAh/cm$^2$ (at 0.5 mA/cm$^2$); columnar diameter ca. 300 nm; and lengths 1-5 μm (Cheng, et al., Angew. Chem. Int. Ed. 10.1002/anie.201707093).

In another attempt, the Pacific Northwest National Laboratory used Li metal deposited onto Cu foil in 1M $LiPF_6$ in PC with up to 200 ppm $H_2O$ additive at 0.1 mA/cm$^2$ for 15 h to give nanorod diameter 260 nm and length 9 μm (Qian, et al., Nano Energy 2015, 135-144); or with 0.05M $CsPF_6$ additive to produce 30 nm diameter rods (Zhang, et al., Nano Lett. 2014, 14, 6889-6896).

In yet another attempt, Xiamen University (China) focused on galvanostatic or potentiostatic deposition on Cu working electrode from a Li foil using 1M $LiPF_6$ in organic solvent (PC, 2:1 EC:DMC) with 50 ppm $H_2O$ additive at fixed current density of 0.1 mA/cm$^2$ for up to 400 min; nanorod diameters 200-300 nm (Tang et al. J. Raman Spectrosc. 2016, 47, 1017-1023).

Thus, there remains a need for a lower cost, lower energy consumption process for forming lithium, particularly lithium that is resistant to the life cycle issues with current production results as well as being amenable to direct foil formation on substrates.

SUMMARY

Embodiments described herein relate generally to a system for lithium metal synthesis comprising a cathodic half-cell comprising and an anodic half-cell. The cathodic half-cell comprising: a cathode half-cell housing; a cathode electrode holder engaged with the cathodic half-cell housing; a cathode electrode engaged with the electrode holder; a catholyte disposed within the cathode half-cell housing. The anodic half-cell comprising: an anode half-cell housing; an anode electrode holder engaged with the anodic half-cell housing; an anode electrode engaged with the electrode holder; an anolyte disposed within the anodic half-cell housing. The system further comprises an ion-permeable membrane positioned between the cathodic half-cell and the anodic half-cell with cathodic side exposed to the catholyte and an anodic side exposed to the anolyte, the ion-permeable membrane separating the anolyte from the catholyte and impermeable to both. The cathodic half-cell electrical is in communication with the anodic half-cell by an electrical connection external to the cathodic half-cell and the anodic half-cell between the anode electrode and the cathode electrode configured for the flow of electrons.

Another embodiments relates to a method for lithium metal synthesis. The methods comprises: flowing electrons from an anodic half-cell comprising an anode half-cell housing, an anode electrode holder engaged with the anodic half-cell housing, an anode electrode engaged with the anode electrode holder, and an anolyte disposed within the anodic half-cell housing, through an electrical connection to a cathodic half-cell comprising a cathode half-cell housing, a cathode electrode holder engaged with the cathodic half-cell housing, a cathode electrode engaged with the cathode electrode holder, a catholyte disposed within the cathode half-cell housing; flowing lithium ions from the anolyte through an ion-permeable membrane positioned between the cathodic half-cell and the anodic half-cell, to the catholyte; reducing lithium ions at the cathode forming lithium metal on the cathode.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 5E shows cycling voltage in red and current in blue as a function of cycling or test time) for symmetrical coin cell of electrodeposited Li vs. electrodeposited Li.

FIG. 8B is at 7.99 k (ca. ×8,000) magnification; FIG. 8C is at ×50,000 magnification; and FIG. 8D is at ×13,000 magnification.

FIG. 13A shows the top view of the membrane with the constitute nanoparticles visible, FIG. 13B shows a side view (240 micron thickness), while FIG. 13C shows the aluminum oxide overcoat.

FIG. 14A shows the untreated membrane; FIG. 14B shows a $TMA/H_2O$ treated membrane has been coated with aluminum oxide; FIG. 14C shows a $DEZ/H_2O$ treated membrane has been coated with zinc oxide.

FIGS. 15A-D are scanning TEM images (scale bar: 1 μm) (FIG. 15A) in dark-field of a sample cross-section prepared via focused ion beam, with corresponding EDS mapping (FIGS. 15B-D) of SEI composition consisting mostly of (FIG. 15B) carbon and fluorine (FIG. 15C) from decomposition and/or side-products of electrolyte ($LiPF_6$). FIG. 15D shows the results of a lithium sample that was exposed to a nitrogen gas flow to indirectly map lithium via $Li_3N$ formation.

Figure 1:
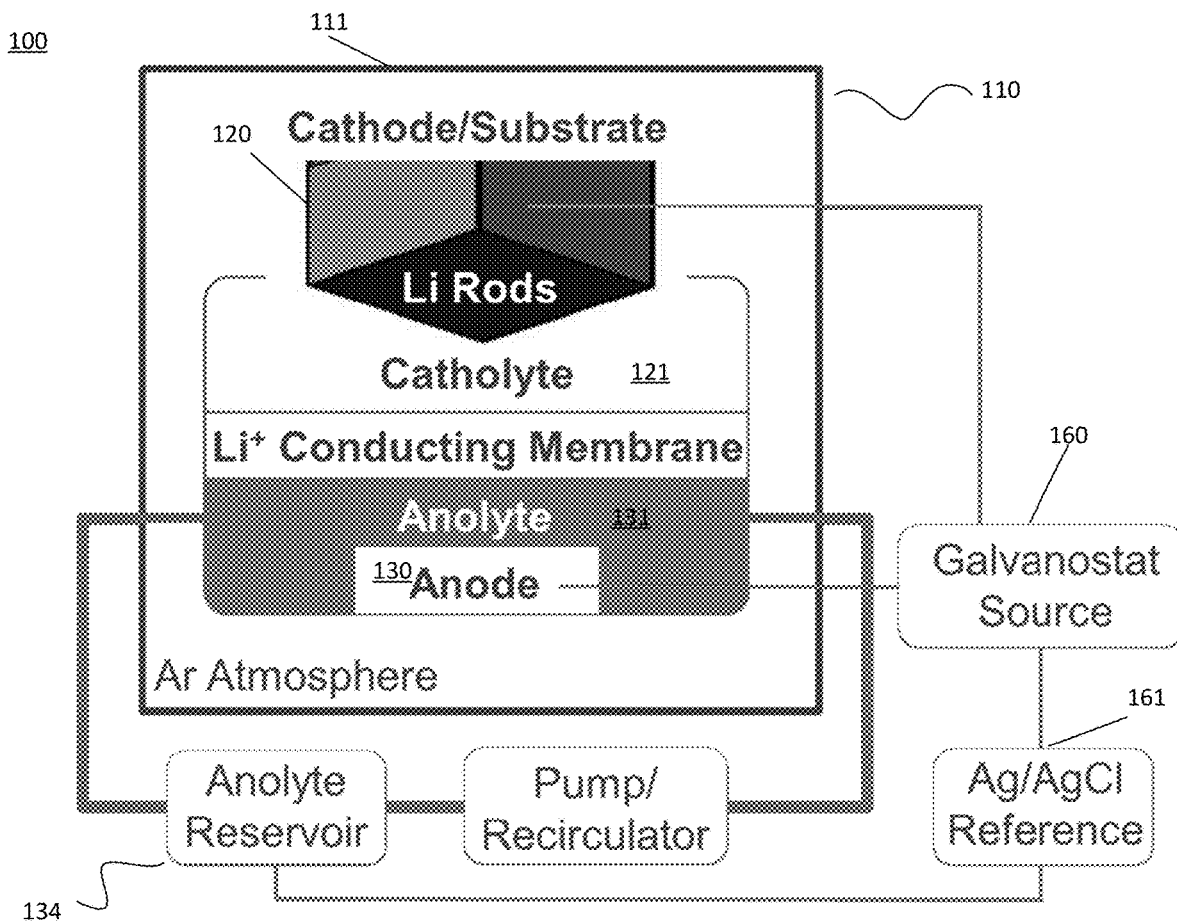
FIG. 1 illustrates a general electrodeposition apparatus in accordance with one embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally the use of a room temperature electrodeposition method and the optimization of process parameters and conditions to produce a film of nanostructured lithium metal onto a conductive substrate from an aqueous source of lithium ions through a lithium-ion conducting separator. As used herein "room temperature" shall mean temperatures within 15 to 40° C.

In one embodiment, an electrolytic cell is utilized for the production of lithium. FIG. 1 illustrates one embodiment of a lithium production system 100 having the electrolytic cell 110. The electrolytic cell 110 includes a cathode 120 and an anode 130, preferably disposed in a housing 111. The cathode 120 is positioned to be disposed in a catholyte while the anode is positioned to be disposed in an anolyte. During the electrolytic production process, the anode serves as the positive terminal and the cathode as the negative terminal. Separating the cathode 120/catholyte 121 from the anode 130/anolyte 131 is a membrane 140. The membrane 140 is a lithium permeable membrane, allowing lithium from the anolyte to cross from the anode to the cathode, passing through the membrane 140.

Figure 7:
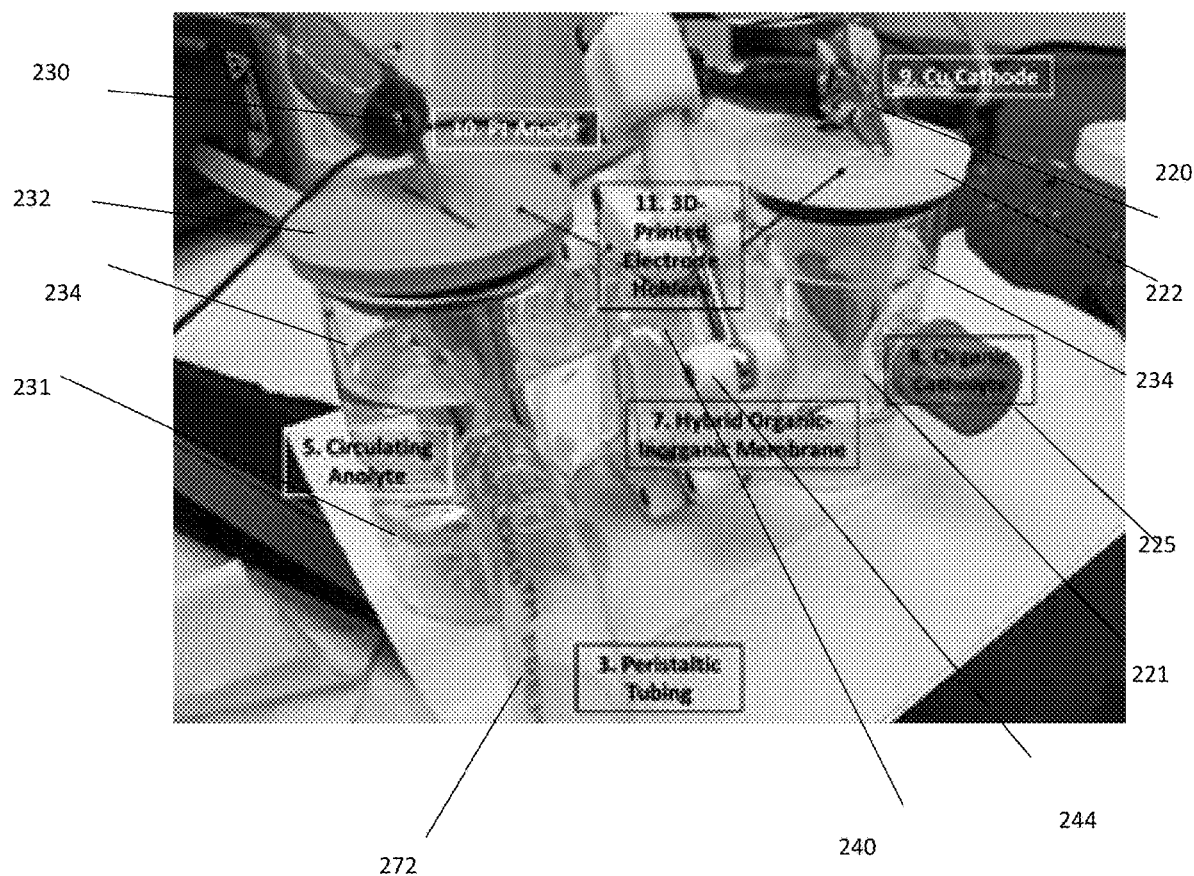
FIG. 7 illustrates the two half-cells of FIG. 6.
Figure 8C:
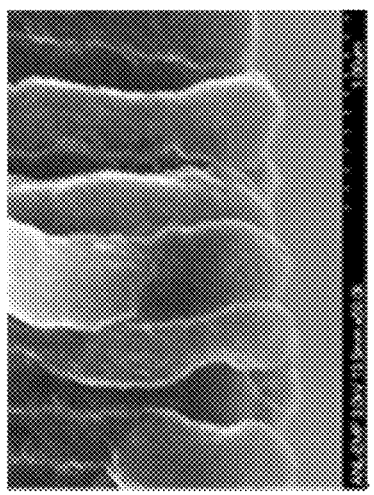
FIGS. 8B-D are SEM images of the blue deposit on copper foil of FIG. 8A, showing uniform, densely-packed, dendrite-free lithium metal nanorods produced in a glass flow cell with a hybrid polymer-inorganic oxide membrane.
Figure 8D:
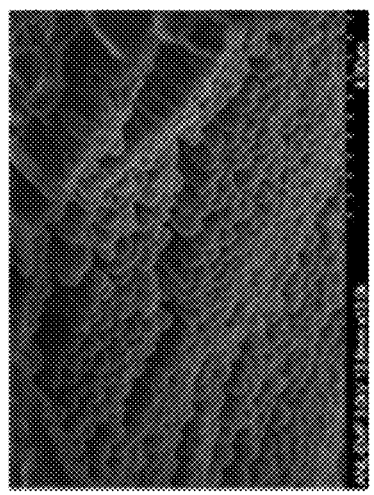
Figure 8B:
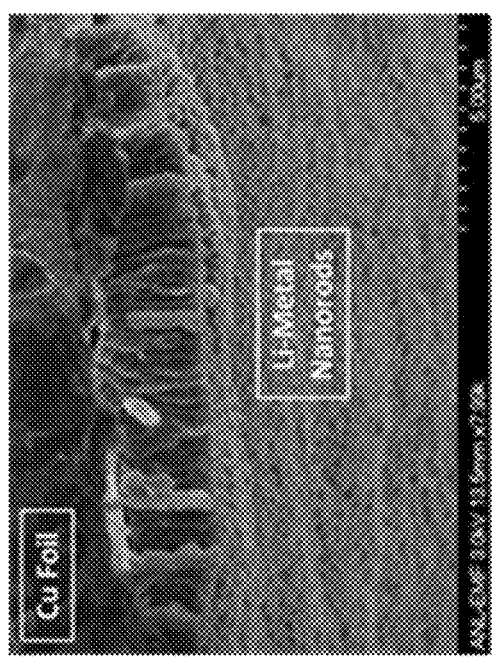
Figure 8A:
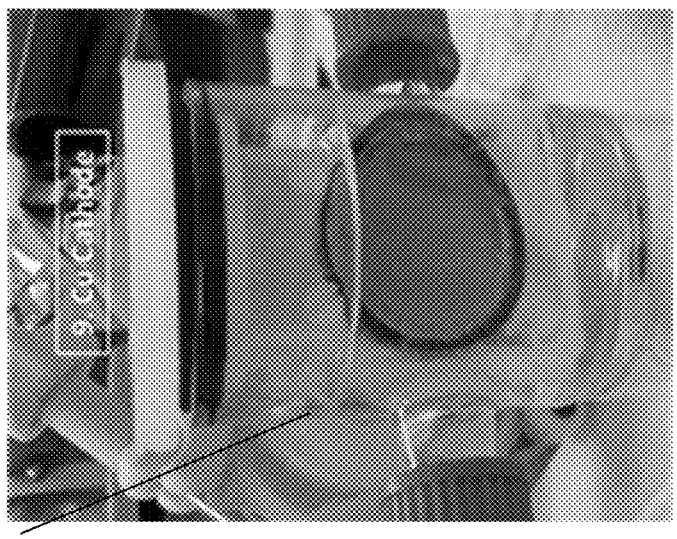
FIG. 8A is an image of a half-cell with the cathode (copper), the deposited material visible on the cathode.

The system 100 further includes the anolyte supply subsystem 134 in communication with the electrolytic cell 110 to provide anolyte. The anolyte supply system provides renewable source of lithium. In one embodiment, the catholyte 121 is provided and replenished by a catholyte supply system 225. The catholyte supply system 225 and the anolyte supply system 272 are best shown in FIGS. 7 and 8A where a peristaltic tube may be connected to the respective anode half-cell and cathode half-cell. In the embodiment of FIG. 1, the membrane 140 which is adhered to an assembly for the cathode to create a well into which a limited amount of catholyte can be poured into and the cathode substrate immersed in. Thus, in the embodiment of FIG. 1, the catholyte is not replenished.

A galvanostat 160 is provided in electrical with the cathode and electrode. The galvanostat 160 is configured to supply and, in a preferred embodiment, measure both the current applied to the electrolytic cell 110 and the resulting full cell voltage. The anode 130 receives current from galvanostat 160. The galvanostat 160 may be provided with a reference electrode 161 with a known electrode potential and electrolyte to provide a point of reference, such as the use of a commercially available reference immersed in the anolyte. Further details on the individual components of a lithium production system are described below.

Figure 2:
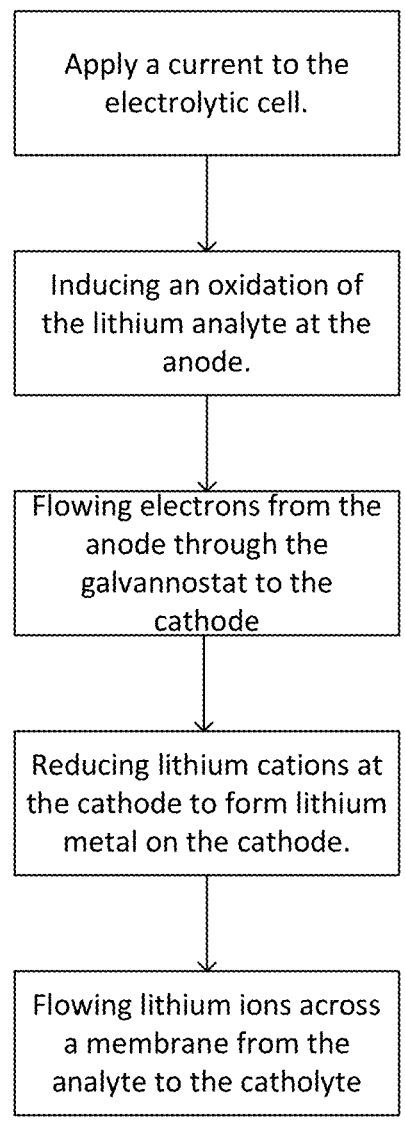
FIG. 2 illustrates one embodiment for a method for electrodeposition of lithium.
Figures 3A, 3B, 3C:
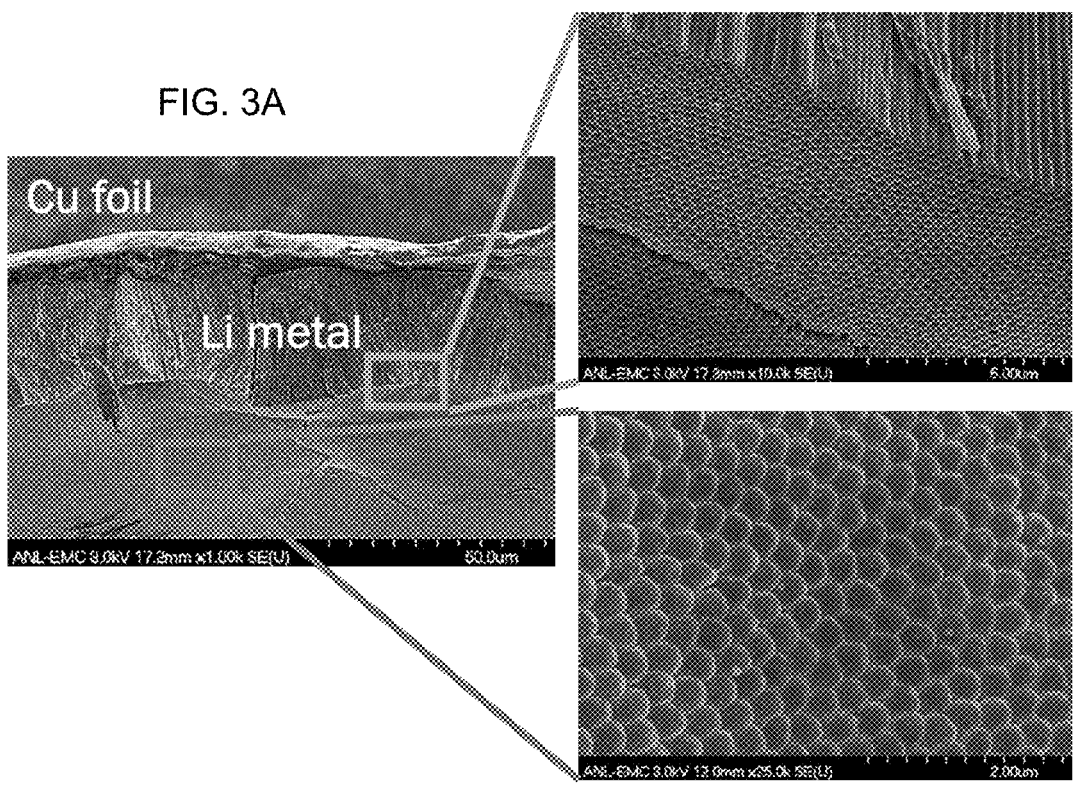
FIG. 3A is an SEM photomicrograph of lithium metal deposited on a copper film in accordance with one embodiment.
FIG. 3B is an enlargement of the indicated portion of FIG. 3A showing a perspective view of the lithium structures, with the elongated lithium rods and hemispherical tips visible.
FIG. 3C is an enlargement of the indicated portion of FIG. 3A showing the hemispherical tips.
Figure 4A:
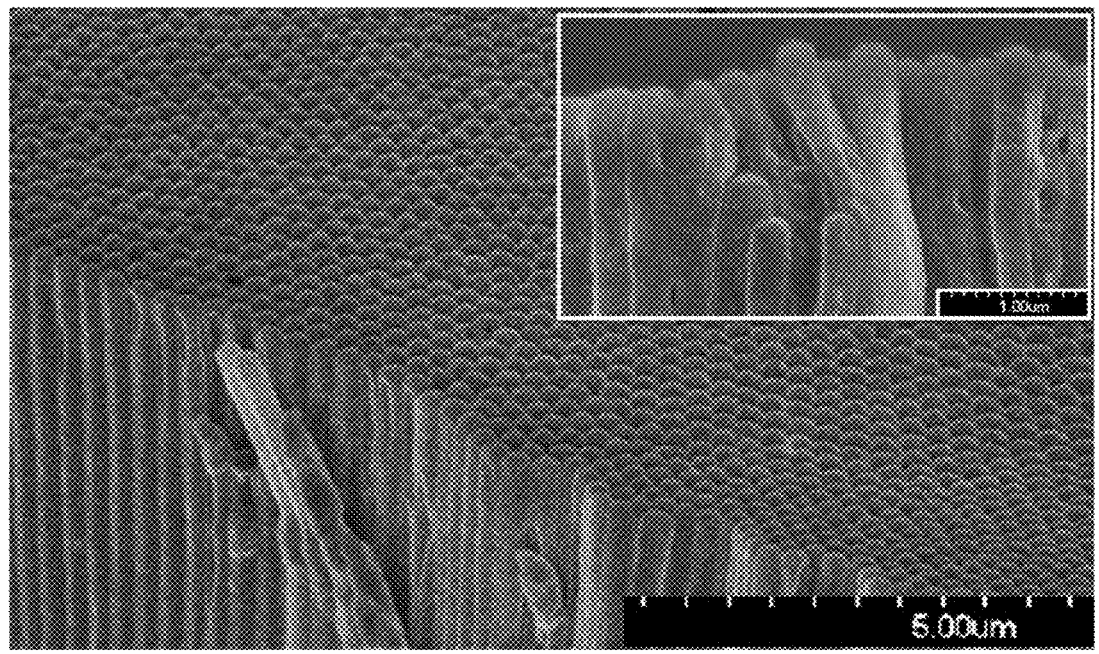
FIG. 4A is a SEM photomicrograph of the deposited lithium, with the inset showing an enlarged view of the lithium columns/rods.
Figure 4B:
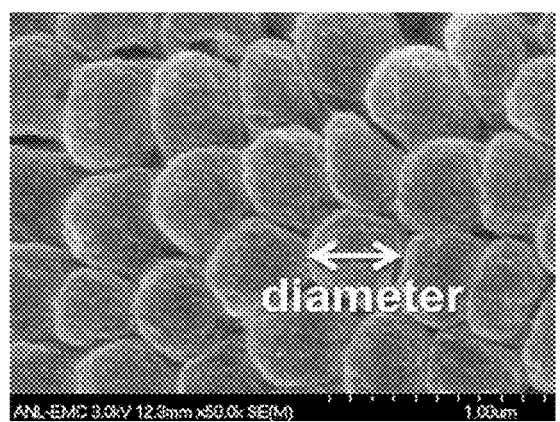
FIG. 4B illustrates another view of the deposited lithium rods indicating the dimension corresponding to diameter.
Figure 4C:
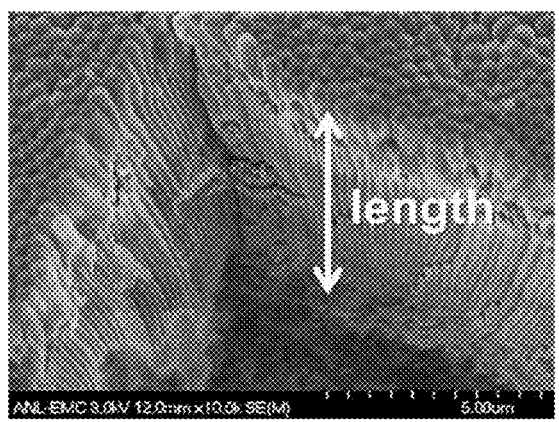
FIG. 4C is yet another view of the deposited lithium rods indication the dimension corresponding to length.

Another embodiment of the invention relates to a method or producing lithium. For example, one method of production utilizes a system such as shown in FIG. 1. FIG. 2 illustrates the steps of an embodiment for the production of lithium. A current is applied to the electrolytic cell at the anode. The anolyte is oxidized at the anode, releasing electrons that flow through the galvanostat to the cathode. At the cathode, the Lithium cations are reduced and deposited as lithium metal on the cathode. Lithium ions flow through the membrane 140 to maintain the charge balance as lithium ions are reduced to neutral lithium metal. A combination of advanced electron microscopy imaging techniques and spectroscopic elemental composition reveals that each lithium metal nanorod is coated by a thin, solid electrolyte interphase SEI whose composition depends on the catholyte used. The anodic half-reaction: $H_2O_{(liq)} \rightarrow \frac{1}{2} O_{2(gas)} + 2H^+_{(aq)} + 2\ e^-$. The cathodic half-reaction: $Li^+_{(aq)} + 1\ e^- \rightarrow Li_{(s)}$. In particular, embodiments of the room-temperature electrolysis are different from the current commercial production of lithium metal via molten salt electrolysis. Commercial lithium is made by passing current through a molten salt mixture of lithium chloride and potassium chloride (the latter added to increase the mixture's conductivity. This process requires energy-intensive heating to an elevated temperature of 450° C., and produces non-environmentally friendly chlorine ($Cl_2$) gas as a by-product.

Figure 17:
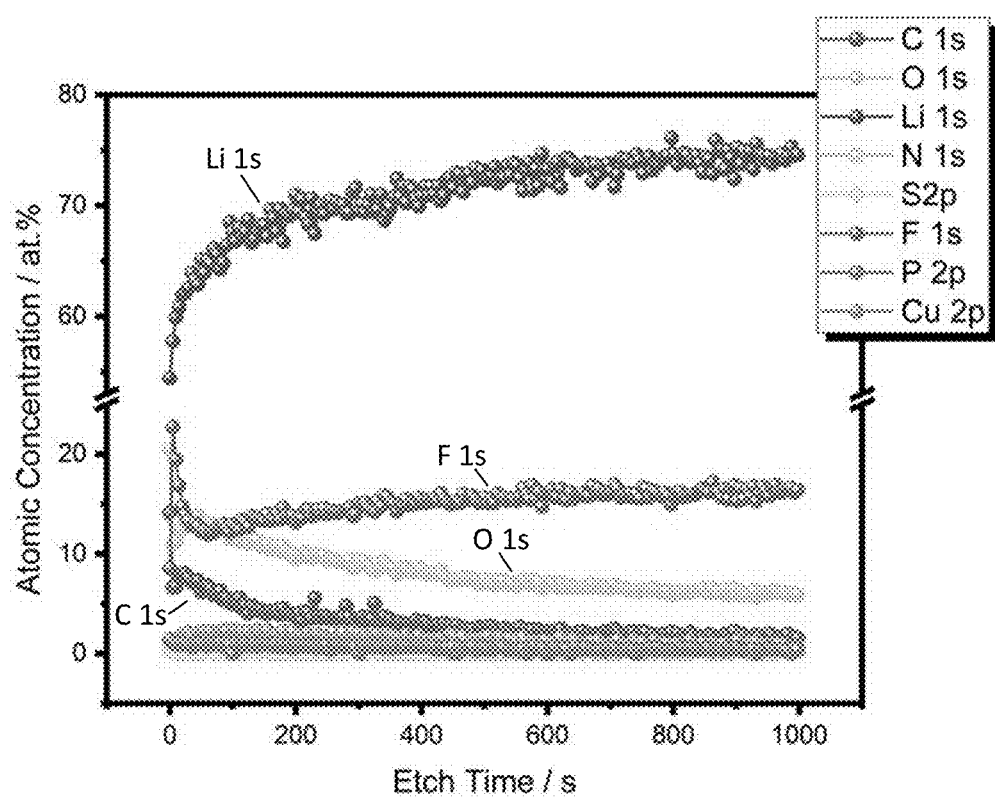
FIG. 17 shows atomic concentration as etching of an electrodeposited film.

A fluorine-containing SEI layer that is formed under the particular set of electrodeposition conditions detailed herein is advantageous for the performance of lithium metal films (produced in this manner) as anodes in batteries. A combination of advanced electron microscopy imaging techniques and spectroscopic elemental composition reveals that this lithium metal is covered by a thin, solid electrolyte interphase (SEI) whose composition may depend on the catholyte used. X-ray photoelectron spectra of a sample of electrodeposited lithium metal film confirms the presence of this fluorine-containing SEI produced during the electrodeposition process. The lithium and fluorine appear to have steady-state concentrations throughout argon ion plasma etching of a sample of electrodeposited lithium metal film, suggesting fluorine is contained within the electrodeposited lithium anode as seen in FIG. 17.

Figure 18:
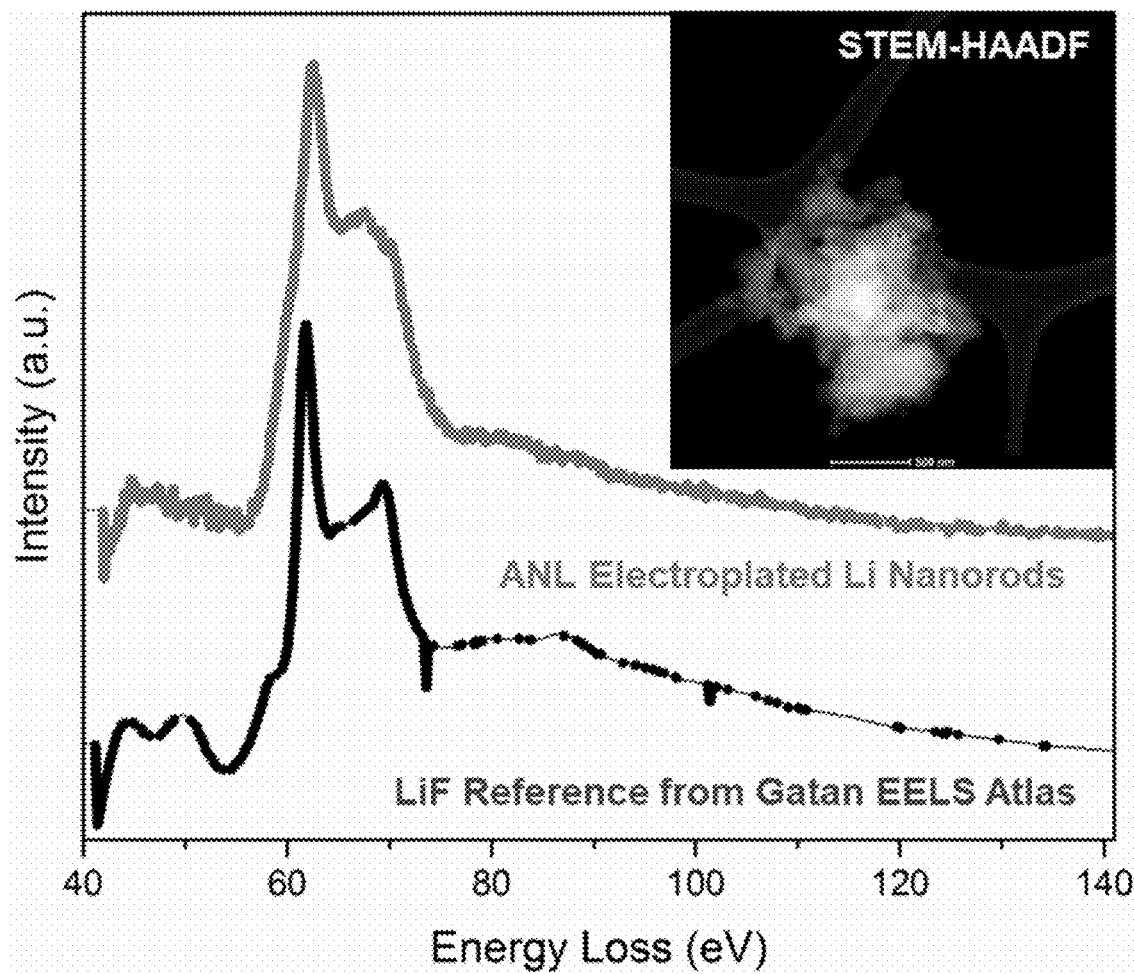
FIG. 18 shows a comparison of electron energy loss spectra ("EELS") for a sample of electrodeposited lithium metal film and its fluorine-containing SEI with reference materials shows that a composition of this fluorine-containing SEI may in part be lithium fluoride (LiF).

FIG. 18 shows a comparison of (EELS for a sample of electrodeposited lithium metal film and its fluorine-containing SEI with reference materials shows that a composition of this fluorine-containing SEI may in part be lithium fluoride (LiF).

Figure 19A:
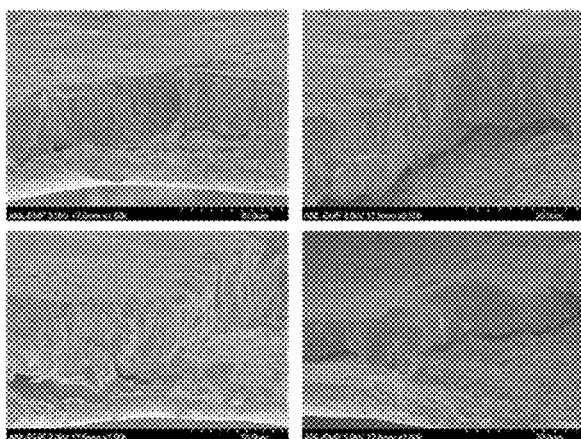
FIGS. 19A-B show SEM images of lithium metal electrodes in coin cells that were cycled and then opened show that a commercial lithium foil without this fluorine-containing SEI develops a significantly thicker mossy and/or dendritic lithium growth as seen in the right panels of FIG. 19A (electrodeposited by one embodiment) and in the left panels of FIG. 19B (commercial lithium foil).
Figure 19B:
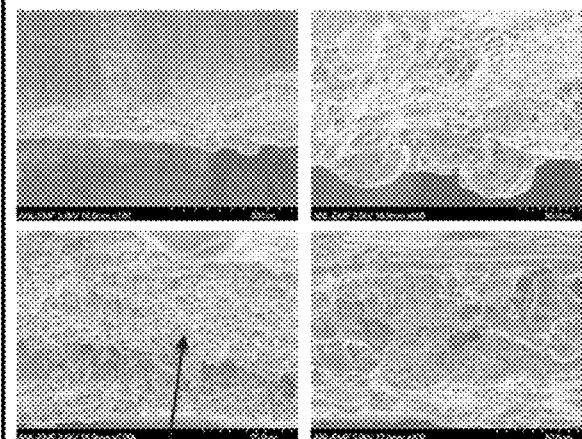

Surprisingly, this fluorine-containing SEI, which may exist residually within the electrodeposited lithium anode, is beneficial to battery performance by minimizing the growth of mossy and dendritic lithium that occurs during battery cycling. SEM images of lithium metal electrodes (either commercial lithium foil or our electrodeposited lithium metal on copper foil) in coin cells that were cycled and then opened show that a commercial lithium foil without this fluorine-containing SEI develops a significantly thicker mossy and/or dendritic lithium growth as seen in FIG. 19A (electrodeposited by one embodiment) and FIG. 19B (commercial lithium foil).

In one embodiment, the method of production includes one or more process parameters. The process parameters may be controlled to provide a desired result. In one embodiment, the process parameters include cathode materials, anode materials, current density, duration of electrodeposition time, electrolyte composition, and substrate properties (including material, surface texture, and pretreatment). The described system operates in an atmosphere. In one embodiment, the cell can be operated outside of a controlled a glovebox and in ambient, as long as the electrodeposited lithium metal film is protected from air (particularly from oxygen, nitrogen, moisture and carbon dioxide) with a thin coat of non-evaporating organic solvent (e.g., by immediately dipping in propylene carbonate after electrodeposition). Lithium metal reacts with the components of air as follows: (1a) $2\ Li + \frac{1}{2}\ O_2 \rightarrow Li_2O$; (1b) $Li_2O + H_2O \rightarrow 2\ LiOH$; (1c) $2\ LiOH + CO_2 \rightarrow Li_2CO_3 + H_2O$; (2) $3\ Li + \frac{1}{2}\ N_2 \rightarrow Li_3N$.

One process parameter that can be varied is Lithium feedstock flow rate. There is expected to be an optimum lithium feedstock flow rate, as the concentration of lithium ions in the catholyte needs to be maintained as the lithium ions are depleted from solution during deposition onto the cathode substrate. In addition, the anolyte circulation is crucial so as to minimize oxygen gas bubble accumulation on the anode. Bubble accumulation on the anode limits the anode surface area exposed to the anolyte, and can thus affect the rate of electrodeposition. Those skilled in the art will appreciate that the flow rate will depend on the size and dimensions of the flow cell, which values can be predicted. For certain glass flow cell embodiments, flow rates of 5-80 mL/min work well for the electrodeposition process.

Another process parameter that can be varied is the salt used as electrolyte. It has been found that various lithium salts such as lithium hexafluorophosphate ($LiPF_6$), lithium perchlorate ($LiClO_4$), lithium bisfluorosulfonimide (LFSI), lithium tetrafluoroborate ($LiBF_4$), and their mixtures thereof, can be dissolved in organic solvents such as acetonitrile (MeCN), dimethyl carbonate (DMC), ethyl methyl carbonate (EMC), ethylene carbonate (EC) and propylene carbonate (PC) to provide a catholyte that is at least 1 molar concentration in lithium ions. In general, thinner SEI coatings over each individual nanorod are observed with lower concentrations of $LiPF_6$ (i.e., in mixtures with other lithium salts).

With regard to the current density, the current density (at fixed electrodeposition time duration) primarily affects the length of the lithium metal nanorods, in that higher current densities result in longer rod lengths and overall lithium metal film thickness. In one embodiment, the current density is from $0.5\ mA/cm^2$ to $6\ mA/cm^2$). Nanorod formation has been observed in electrodeposition runs performed at current densities as high as $10\ mA/cm^2$. At current densities higher than $10\ mA/cm^2$, the lithium metal morphology appears to be mossy growth rather than nanostructured.

With regard to the duration of electrodeposition time, the time (at fixed current density) primarily affects the length of the lithium metal nanorods, in that longer electrodeposition runs result in increased rod lengths and overall lithium metal film thickness.

In one embodiment, the lithium production results in lithium metal nanorods. The nanorods have a diameter of 250 nm to 400 nm. The nanorods have a length of up to 60 μm at a current density of $6\ mA/cm^2$ for an electrodeposition time of 40 minutes, which corresponds to the "thickness" of the deposited lithium layer. It is believed that a hemispherical tip is the most thermodynamically stable structure as it minimizes surface area. Dendrite formation is minimized at such controlled current densities since the nanorod structure serves as an ordered template for lithium metal deposition.

Turning back to the components of the system 100, again with reference to FIG. 1, one embodiment of the system 100 includes the electrolytic cell 110 with a cathode 120 and anode 130. The cathode serves as the location for the electrodeposition of lithium. In general, the room-temperature process previously described can yield conformal coatings of thin lithium metal films, consisting of rods of uniform length and diameter, onto the substrate of choice, even on substrates with non-planar surfaces. In one embodiment, the deposited lithium may be removed from the substrate for use as "bulk" lithium. Lithium metal production using the room-temperature electrodeposition process presents advantages such as energy savings (no need for heating to elevated temperatures) and environmental impact (only by-product is oxygen gas) over other "bulk" lithium generation processes.

In another embodiment, the cathode includes a substrate that is to serve a substrate under the lithium. In terms of producing lithium metal laminates, the materials produced in accordance with the processes described herein yield significantly better materials compared to lithium pressed and rolled onto a current collector. The latter can suffer from delamination, thus causing areas of non-uniform electrical contact with the current collector. In a particular embodiment, the cathode may comprise a substrate such as metal (e.g., Cu, Li) as well as composites such as carbon-coated metals (e.g., graphite on Cu) or oxide-coated substrates (e.g., $Li_2S$ or $LiAlO_2$ on Cu) in the form of sheets, foils, and foams. The cathode may be the same material as the "substrate" underneath the lithium foil. Alternatively the cathode and the substrate may be different, such as for use of the substrate as a sacrificial layer. The use of a different material may also be utilized due to their further alteration of the electrical properties of the lithium layer or due to particular morphological impacts on the deposited lithium. The use of composite substrates (e.g., coatings such as graphite and oxides) can lead to enhanced stability of the lithium metal nanorods as anodes, by providing an additional SEI that can suppress undesirable dendrite growth, formation of pockets of "dead" lithium (i.e., lithium metal that are electrically isolated from the current collector) and side-reactions with electrolyte that consume the active lithium metal. In particular, the ability to conformally coat all surfaces of a foam with lithium metal via electrodeposition can realize 3D-architectures for future battery configurations. Further, the substrate material may have a surface texture such as columnar or fibrous. These surface textures can increase the over-all surface area that can affect battery cycling behavior by decreasing the voltage drop across the electrodes. In addition, the substrate may undergo a pre-treatment such as acid pre-wash or plasma treatment to remove substrate surface impurities, or with a pre-coating of carbon or oxide (e.g., via atomic or molecular layer deposition) to create an artificial SEI that should be thin enough and lithium- and electron-conductive to allow for lithium metal deposition between the underlying current collector and the artificial SEI.

The cathode is associated with a catholyte. The catholyte serves as the electrolyte for the cathode. In one embodiment, the catholyte includes a lithium salt in an organic solvents. For example, the lithium salt may be selected from $LiPF_6$, $LiClO_4$, $LiBF_4$, LiFSI, or combinations thereof. The organic solvent may be selected from DMC, EMC, PC, MeCN or combination thereof. In one embodiment, more than one salt and/or more than one solvent may be used to form the catholyte.

With continued reference to FIG. 1, the anode comprises an anode material. For example, in one embodiment a platinum group material, such as platinum, platinum-coated titanium, platinum-coated steel (e.g., SS316) or platinum-coated copper sheets, foil or foam.

The anode is associated with an anolyte. The anolyte serves as the electrolyte for the anode. In one embodiment, the anolyte includes a lithium salt in a water solvent. For example, the lithium salt may be selected from $Li_2CO_3$, $LiHCO_3$, $Li_2SO_4$, $LiHSO_4$ or combinations thereof. In one embodiment, more than one salt and/or more than one solvent may be used to form the anolyte. In general, the pH of the anolyte solution may be adjusted to be as neutral as possible (i.e., pH 7) with the use of lithium bases such as $Li_2CO_3$ in order to minimize hydrogen ion concentration and reduce the possibility of co-reduction on the cathode as hydrogen gas.

The electrolytic cell 110 includes the anode and the cathode separated by a lithium ion conducting membrane. The lithium ion conducting membrane further maintains physical separation of the anolyte and the catholyte. The membrane 140 is a nonporous hybrid membrane that allows for asymmetric media (e.g., aqueous on one side, organic on the other side) while limiting transport to lithium ions by facilitated diffusion through the membrane. For example, in one embodiment the membrane may be inorganic, such as commercially available ceramic membranes. Further, the membrane may be an organic polymer or a hybrid organic polymer-inorganic composite. In one embodiment, the membrane has the following properties: (1) does not allow the movement of water from the anode to the cathode, since the lithium metal being deposited on the cathode will react with water; (2) ion-conducting, but not necessarily limited to lithium ions, as it is easier to pre-treat the lithium ion feedstock and control its impurities; (3) stable against both aqueous and organic media; (4) sufficient dielectric stability so as not to have its structure compromised during electrodeposition runs (voltages can approach 10V). Commercial membranes, such as the lithium-ion conducting glass by Ohara Corporation, can be used, as well as any other composite membranes with lithium-ion conductors embedded in a non-porous matrix.

Figure 5A:
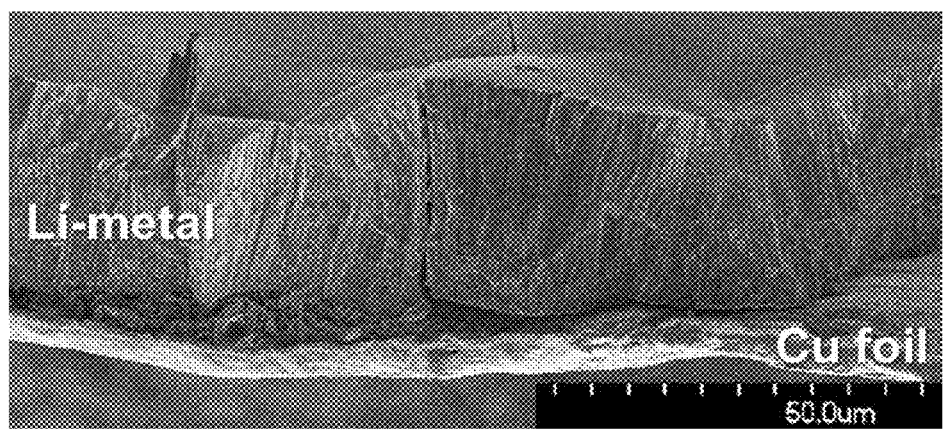
FIG. 5A illustrates a side view of a cross-section of lithium metal on a copper foil with a thickness of 30 μm serving as an anode.
Figure 5B:
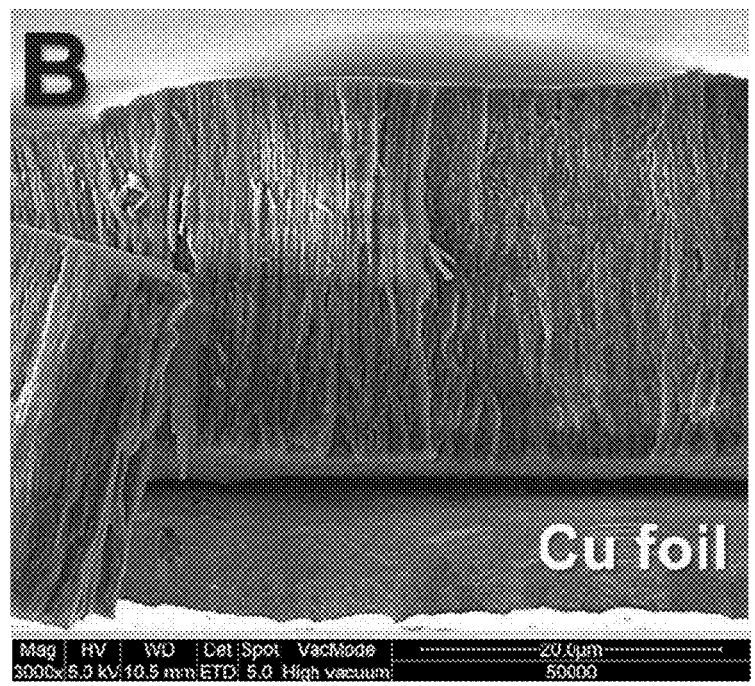
FIG. 5B illustrates the same copper foil and lithium metal anode but after usage in a battery, with the thickness reduced to 20-25 μm.
Figure 5C:
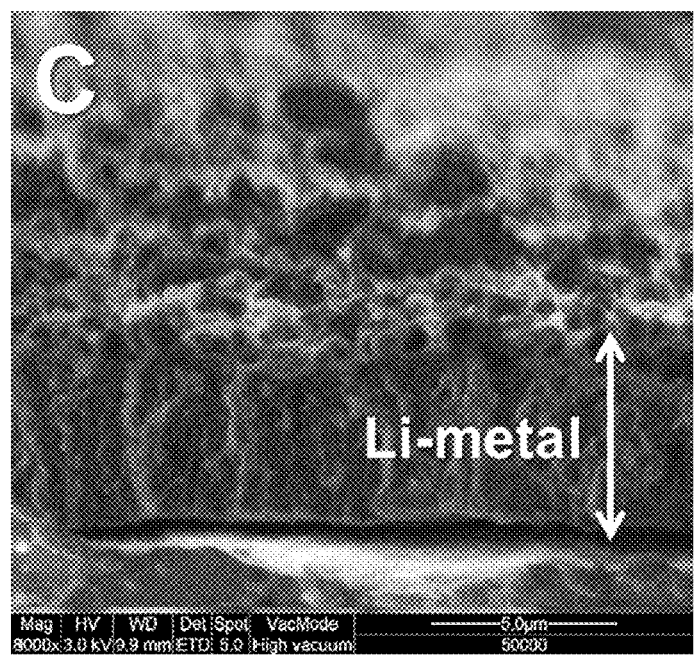
FIG. 5C shows the lithium metal layer on the initially bare copper foil cathode.
Figure 5D:
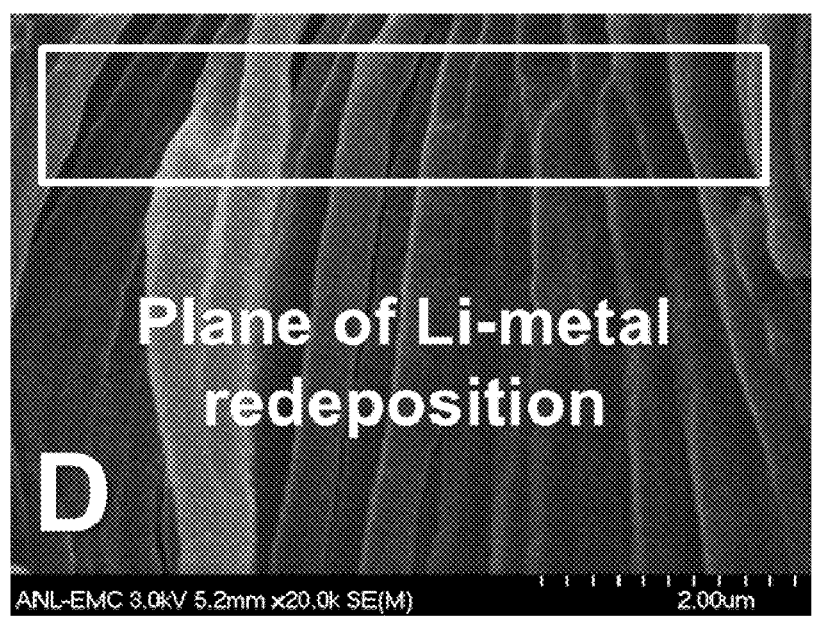
FIG. 5D shows the lithium metal with the plane of redeposition indicated where lithium metal is deposited during current reversal (recharge).

FIGS. 5A-D show an experimental proof-of-concept. The proof-on-concept experiment was performed in a glass see-through cell, in lieu of a conventional coin cell format. The electrodeposited lithium film of initial thickness 30 μm (i.e., length of the rods) on copper foil was used as an anode and initially discharged. In this symmetrical configuration, the cathode was an initially bare copper foil and the purpose of the discharge test was to determine if we can successfully move the lithium from the anode to the cathode. FIG. 5C shows successful movement of the lithium from the anode (now reduced in thickness, per FIG. 5B) and plated it onto the copper cathode. In the second part of this test, the anode was then charged and it can be seen that additional lithium is deposited as a continuation of the rods. Rather than the mossy, dendritic growth normally observed, the additional deposition continues as rods. The prior art mossy growth is a non-structured lithium growth that can lead to battery failure as a result of the dendrites piercing the separator, leading to shorting of the cell.

Figure 5E:
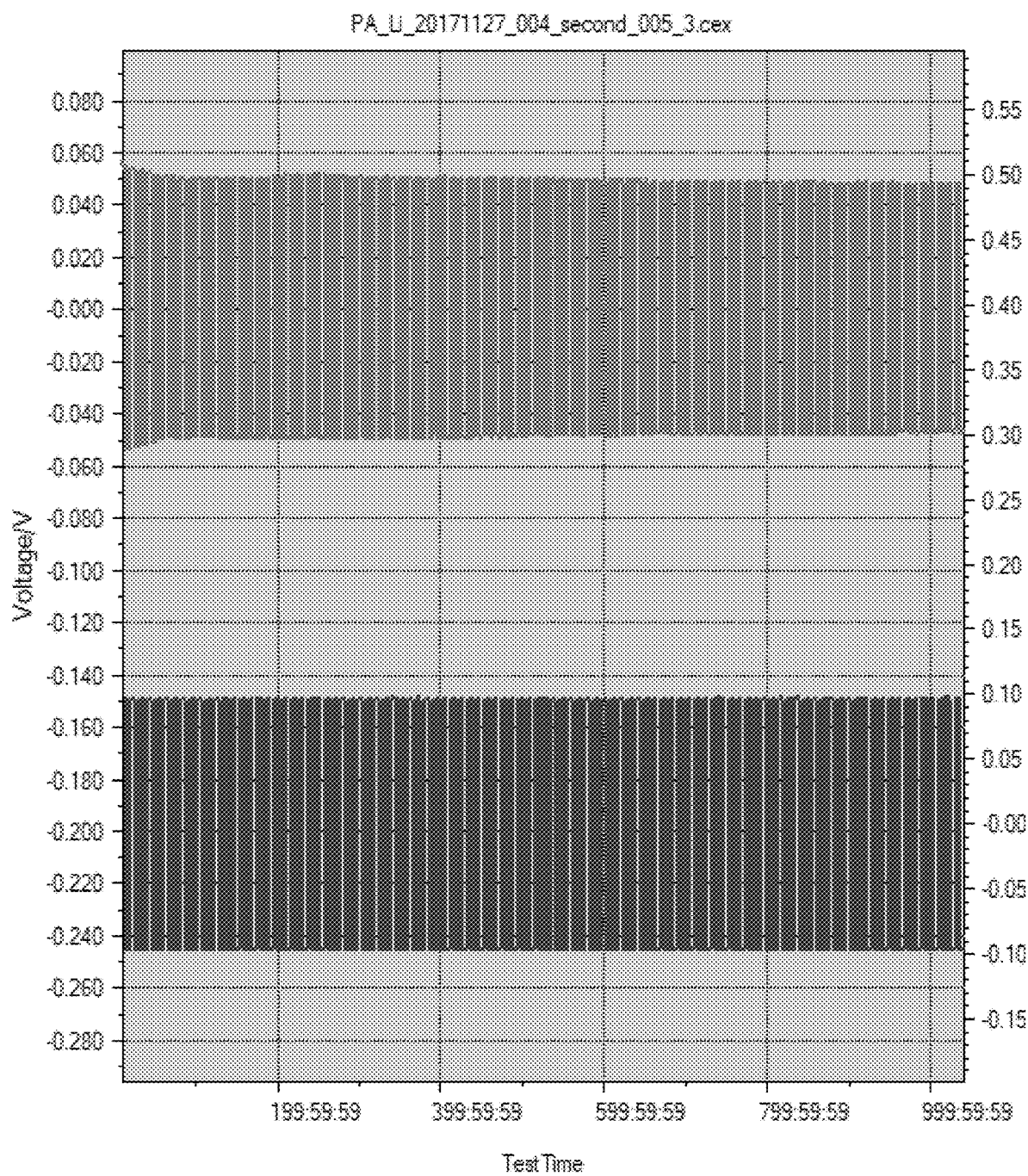
FIG. 5E illustrates cycling tests (Arbin or LANHE LAND testers) for coin cells made with electrodeposited lithium metal.
Figure 5F:
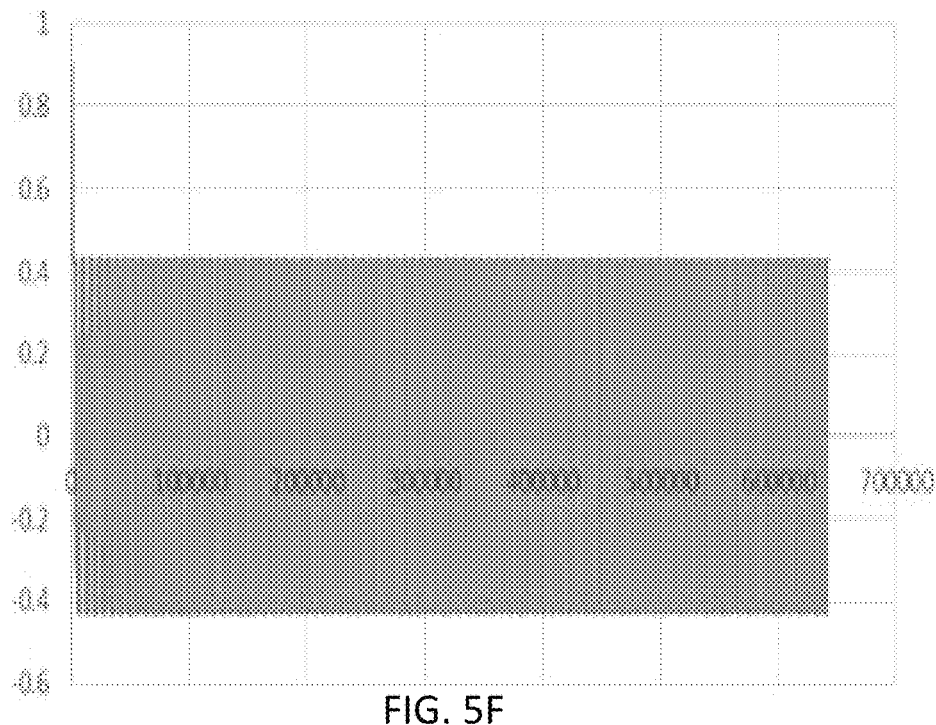
FIGS. 5F-G show cycling voltage and current, respectively, (test time on x-axis) for asymmetrical coin cell of electrodeposited Li vs. NMC 532 at C/10 rate in Gen 2 electrolyte (1.2M $LiPF_6$ in 3:7 EC:EMC). The electrodeposited Li on Cu foil used as anodes consist of densely-packed dendrite-free arrays of nanorods typically 25 μm in length.
Figure 5G:
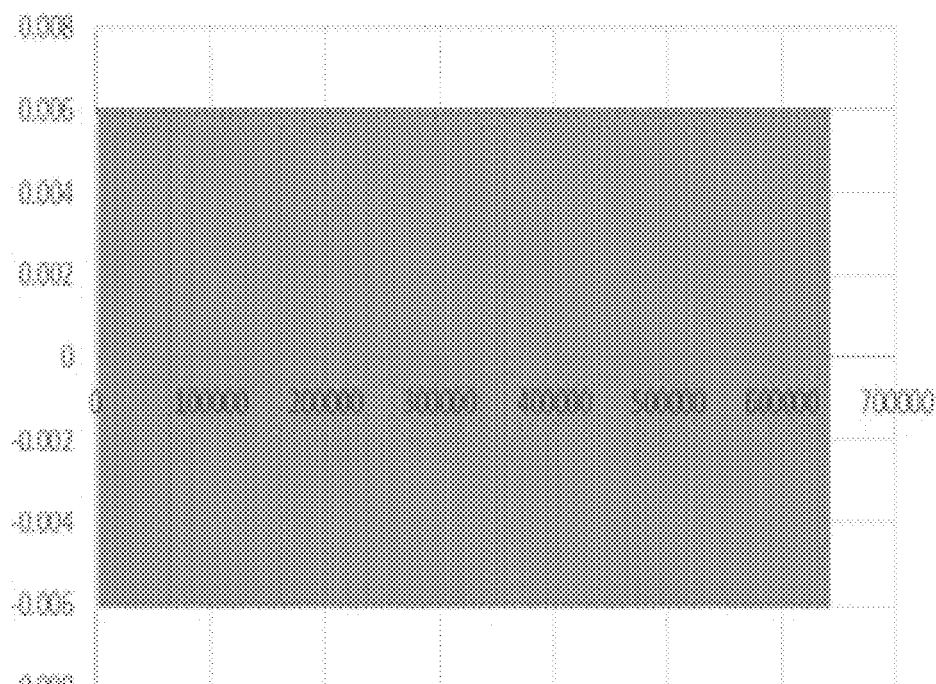

Further experiments were performed with coin cell tests where the electrodeposited lithium nanorods were used as anodes against various cathode materials such as bare copper, electrodeposited lithium on copper foil (symmetrical coin cell), and conventional electrodes used in lithium-ion batteries, such as NMC 532, LTO and graphite on copper. These experiments exhibited excellent cycling (at least 100 discharge/charge cycles) for both symmetrical and asymmetric (vs. NMC 532) coin cells. FIGS. 5E-G show data from these experiments.

Glass Flow Cell

Figure 6:
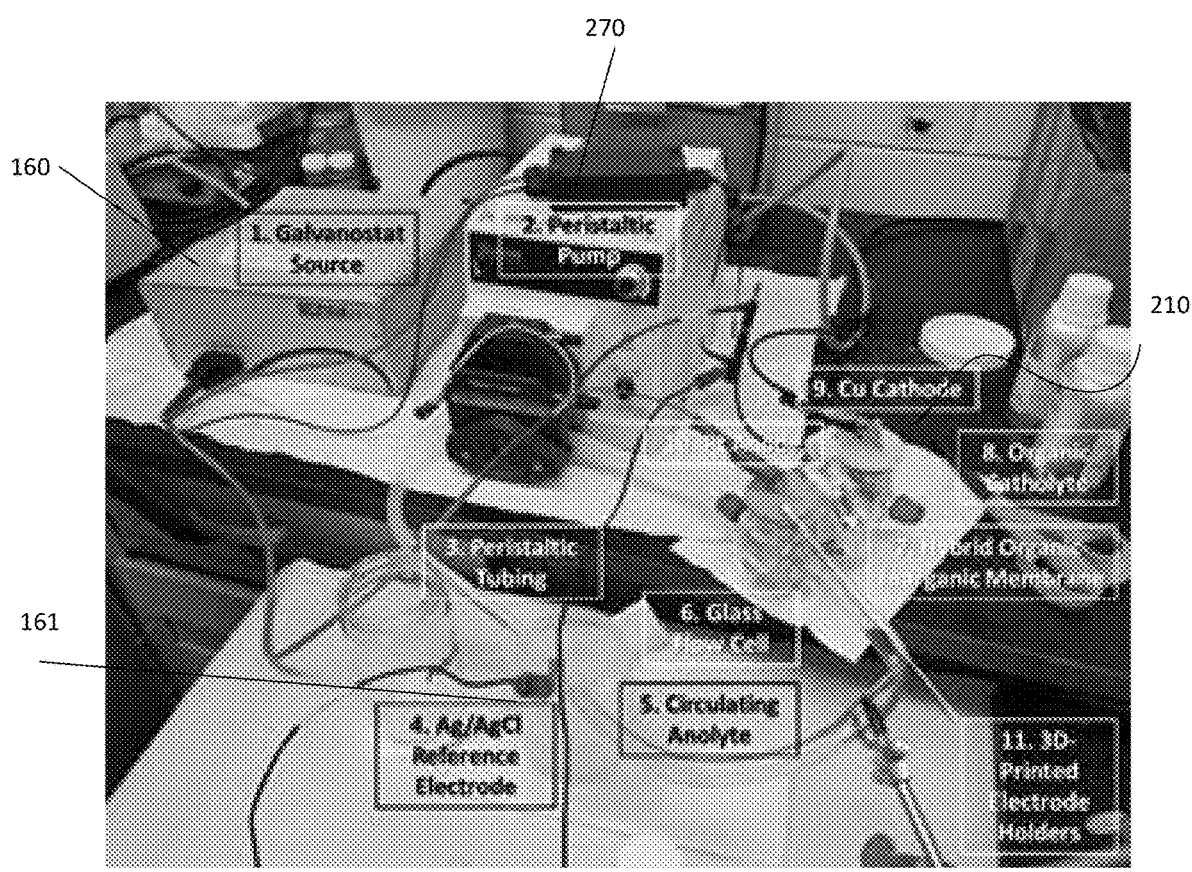
FIG. 6 illustrates one embodiment of a system for electrodeposition of lithium comprising a two half-cell structure.

In another embodiment, the system 200 for production of lithium comprises a glass flow cell assembly 210 with a lithium permeable membrane 240 for room-temperature lithium-metal synthesis (FIG. 6). In the embodiment of FIGS. 6 and 7, two half-cells (cathodic half-cell 224 and anodic half-cell 234). Each of the half-cells are, for example, made from glass vessels (Part No. 6 in FIG. 1) that are connected via a passage 244. The passage regulated by a membrane 140 that is permeable to lithium ions, for example, a hybrid polymer-inorganic oxide nanocomposite membrane. The membrane 140 is a nonporous hybrid organic-inorganic composite that can be used with asymmetric media in either compartments (e.g., aqueous in one, organic in the other side) while limiting transport to lithium ions by facilitated diffusion through the inorganic components. An ideal structure for the membrane involves a polymeric framework or support. The membrane imparts flexibility and its composition is stable in both aqueous and organic media, in addition to having a high dielectric stability to withstand potential biases typically present in system 200 during operation.

The embedded cross-linked nanoparticles can be lithium ion conductors (e.g., lithium iron phosphate ($LiFePO_4$), lithium titanium oxide ("LTO"), lithium cobalt oxide ("LCO"), lithium lanthanum zirconium oxide ("LLZO"), and lithium versions of NASICON-type ceramics (e.g., Ohara LICG powders), including as silica-coated materials) and need to be exposed to the electrolyte solutions in either compartments being separated. The use of asymmetric media is critical to this process (due to incompatibility of lithium metal to water) and thus requires a membrane that will prevent mixing of the organic and aqueous phases while allowing for ion transport. One such membrane is described below.

Further, the cathode half-cell includes a cathode electrode holder 222 and the anode half-cell includes an anode electrode holder 232. The cathode electrode holder 222 (and the anode electrode holder 232) can be formed to facilitate two-side deposition by exposure of two sides of the electrode or single side formation by exposure of a single side. Further, in the embodiment of FIGS. 6 and 7, it is provided with an anolyte circulation system and a catholyte circulation system to flow the respective electrolyte through the respective half-cell. Electrolyte circulation can contribute to enhanced uniformity of the morphology of the resulting Li-metal films by minimizing concentration gradients and build-up of detrimental by-products (if any) at the Li-metal/electrolyte interface.

Ion-Conducting Membrane

In one embodiment, the ion-conducting membrane is a hybrid organic-inorganic nanocomposite membrane. The hybrid organic-inorganic nanocomposite is a nonporous hybrid organic-inorganic composite that can be used with asymmetric media in either compartments (e.g., aqueous in one, organic in the other side) while limiting transport to lithium ions by vacancy diffusion through the inorganic components.

Figure 9:
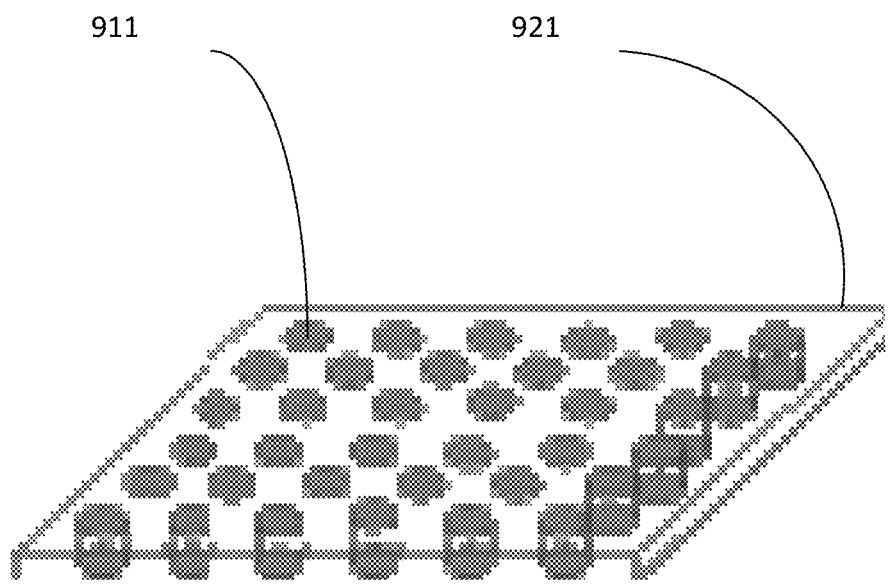
FIG. 9 shows a schematic of one embodiment of a hybrid nanocomposite membrane featuring a polymer framework containing an array of lithium-ion conducting nanomaterials columns.

FIG. 9 illustrates one embodiment of an ideal structure for the hybrid organic-inorganic nanocomposite membrane involves a polymeric framework or support 921 that contains an array of columns of inorganic lithium ion conductor 911. The polymer mesh imparts flexibility and its composition (e.g., propylene, polyurethane, polyethylene oxide ("PEO"), polyethylene glycol ("PEG")) chosen as to be impermeable to and stable in both aqueous and organic media, in addition to having a high dielectric stability to withstand potential biases typically present in devices during operation. In one embodiment, the columns of solid lithium ion conductor comprise solids and may be a monolithic piece, such as a single particle or may be a plurality of interconnected particles forming a pathway through the polymeric framework. In one embodiment, the interconnected particles are nanoparticles. Solid lithium ion conductor columns (e.g., lithium ion conductors, such as silica-coated $LiFePO_4$, LLZO, etc.) may directly span the polymer network in a linear fashion or traverse in a nonlinear path, so long as they provide a single structure or interconnected particles that form linear or nonlinear "channels" of lithium ion transport from anolyte to catholyte.

Many lithium ion conductors reported in literature require some form of heat-treatment either from sol-gel methods or from molten glass reactions. Elevated temperatures, however, are not expected to be compatible with the polymer-based frame described above. The hybrid organic-inorganic membrane is fabricated through room-temperature synthesis and integration of the ion conducting solid into the polymeric frame. In one embodiment, the hybrid organic-inorganic membrane is a porous polymer matrix filed with lithium ion conducting particles and impermeable to the aqueous and organic electrolytes. In a second embodiment, a porous polymer matrix is filed by sequential filtration through the matrix of a first monomer with the lithium ion conducting particles suspended therein and then a second monomer solution. The first and second monomer react by interfacial polymerization to form an organic component that seals the polymer matrix at one side of the membrane.

With regard to that first membrane embodiment, a polymer framework is a porous polymer framework, assembled having the necessary aligned columns (pores) to accommodate a solid lithium ion conductor exposed on both sides (anode side and cathode side of the membrane). The polymer must be stable upon application of voltage up to 10 V and must not be soluble nor react with anolyte and catholyte. In one embodiment, the lithium ion conductors for have ionic conductivities of magnitude $10^{-7}$ to $10^{-4}$ S/cm. In one example, a porous polymer framework may be 3D printed. In further embodiments, other printing methods such as polymer pen lithography or dip pen lithography may be utilized. The size of the pores will be dictated by the particulate size of the lithium ion conducting fillers that will be used. While, the pores need not be perpendicular to the membrane cross-section, slanted pores lead to longer diffusion times for the lithium ions from the anolyte to the catholyte. It is preferred to have as high a pore density as possible to ensure sufficient rates of lithium ion replenishment in the catholyte. Pore densities will inversely depend on the pore size. In one embodiment, pore diameters of 1-1000 μm will work well with this electrodeposition process. The average center-to-center distance will be limited by the printing technique, but generally would be preferred to be the minimum width allowable for the printed porous polymer frame to maintain structural support. A 3D printer may be employed for the preparation of such a membrane to ensure uniformity and to achieve a close-packed array of the ion conducting components, while allowing for excellent control of membrane dimensions (size of overall piece, diameter of inorganic columns, etc.). In one embodiment, the polymer frame and the lithium ion conducting material are simultaneously printed or printed together, such as using dual nozzles. Alternatively, the porous polymer frame can be 3D-printed first, followed by filling in the pores with a slurry of the lithium ion conductors.

The porous polymer framework is then filled, specifically the pores, with lithium ion conducting particles. In one embodiment, the lithium ion conducting particles can be uniformly dispersed in a precursor solution or slurry that can cure at room-temperature into a flexible solid film upon solvent evaporation, or a mixture of pre-polymers with reactive end moieties that react at room-temperature (e.g., "click chemistries") to form a solid covalent network. To ensure structural integrity of the resulting membrane, the interface of polymer and solid ion conducting phases must be in intimate contact (i.e., no spaces or gaps for either electrolyte solvents to diffuse into via capillary forces) via either covalent bonding or noncovalent intermolecular forces of attraction such as van der Waals forces between the polymeric frame and the surfaces of the ion-conducting particles. Other methods to prepare such membranes include: the inorganic component may be extruded as a concentrated slurry in a fast-evaporating solvent, or may be cast onto the pre-fabricated polymer framework, which may then be followed by an encapsulation step to make sure the lithium ion conducting phases do not leach from the membrane and into either electrolyte compartments.

Figure 10A:
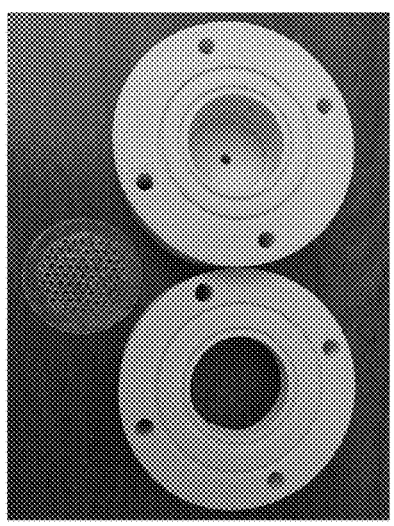
FIGS. 10A-10C illustrate an embodiment of a polymer framework that was 3D printed.
Figure 10B:
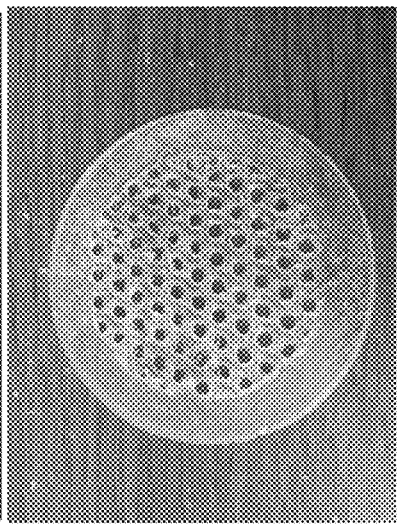
Figure 10C:
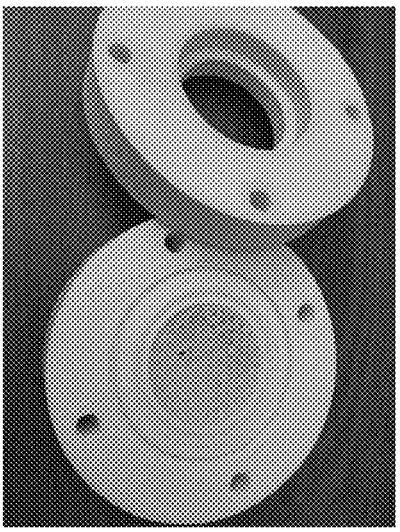

FIGS. 10A-C show one embodiment of 3D printed polymer framework, not yet loaded with a solid lithium ion conductor. FIG. 10A shows the membrane and a membrane holder for positioning the membrane in the lithium electrodeposition apparatus. FIG. 10B shows a top down view of one embodiment of a 3D printed membrane. FIG. 10C shows the membrane of FIG. 10B positioned in a bottom portion of a membrane holder for the lithium electrodeposition apparatus. The membrane holder may comprise an anode compartment and a cathode compartment in a two-part structure with the membrane disposed there between. The membrane holder comprises a material that is stable in either water (for the anode half-cell) or in organic solvent (for the cathode half-cell), preferably both. Both half-cells must be stable when separated by the membrane under the biases typically used during electrodeposition. In one embodiment, the 3D printed membrane can be used with various lithium ion conductors, such as $LiFePO_4$ and NASICON type powders (generally, $Na_{1+x}Zr_2Si_xP_{3-x}O_{12}$, $0<x<3$), such as $Li_2O$—$Al_2O_3$—$SiO_2$—$P_2O_5$—$TiO_2$. The former exhibited an ionic conductivity ~$10^{-9}$ S/cm while the later exhibited an ionic conductivity ~$10^{-4}$ S/cm.

Figures 11A, 11B, 11C:
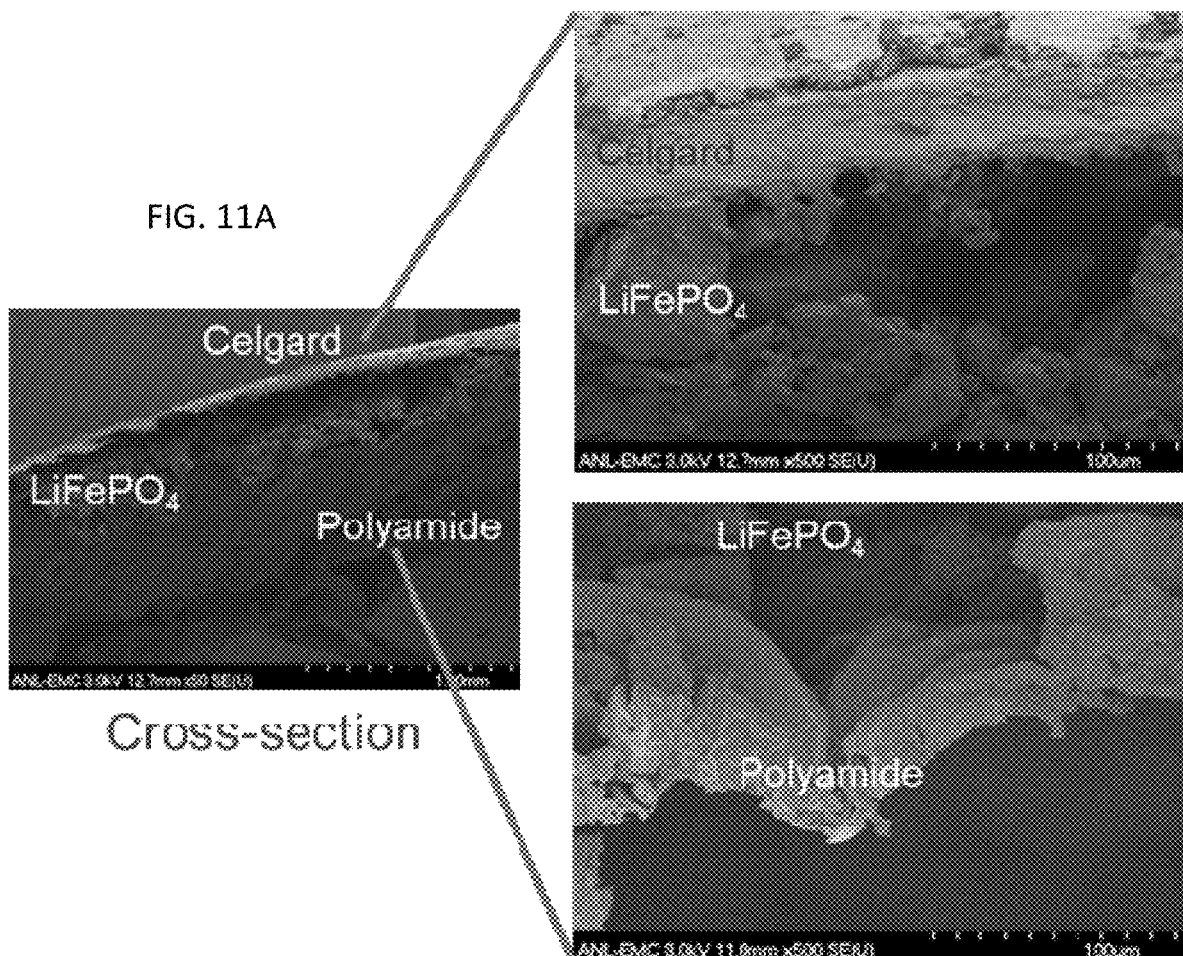
FIGS. 11A-11C are photomicrographs demonstrating structure of one embodiment of a lithium permeable membrane using a polymer support with $LiFePO_4$ encapsulated in the pores of the polymer support via interfacial polymerization.

In another embodiment of an ion-conducting membrane, the membrane includes a polymer matrix and a lithium ion conductor, such as a $LiFePO_4$, that affixed within the polymer matrix, such as onto the surface of polymer supports within the polymer matrix. The polymer matrix is porous, thus the electrolyte solution readily seeps into its pores to interact and "wet" the lithium-ion conducting solids. The lithium ion conductor can be affixed by a polymer through mixture of the conductor with one or more monomers prior to polymerization. In the examples illustrated, the polymer matrix is a porous matrix (e.g., polypropylene/polyethylene/polypropylene (PP/PE/PP) membranes sold as Celgard® membranes) and the lithium ion conductor is disposed in the polymer matrix by interfacial polymerization (FIGS. 11A-C), such as with an organic support layer. In alternative embodiments, the polymers that can be used include polyurethane, polyethylene glycol (aka polyethylene oxide), polyamide, polystyrene. Further, other methods besides interfacial polymerization can be utilized, for example but not limited to cure over time or by heating or UV illumination. It has been found that ionic conductivities of magnitude $10^{-7}$ to $10^{-4}$ S/cm work well as lithium ion conductors for this electrodeposition process. The polymer will ideally seal the nanoparticles within the polymer matrix, and depending on its thickness (which can be controlled by etching) can form a layer on one side. Any unreacted monomers and/or by-products are typically washed out after polymerization. The secured ion conductor need not extend completely through the membrane polymer support in this embodiment, as the ions are able to travel through the polymer support layer, so the conductor only need exposure to be wet on one side (hence the control of the polyamide layer thickness described below).

In the example embodiment using interfacial polymerization, the reaction at the interface of an aqueous and an organic solution containing an amine (m-phenylenediamine) and a carbonyl compound (1,3,5-benzenetricarbonyl chloride). In further embodiments, any primary amine $RNH_2$ (where R=alkyl, aromatic, etc.) can be used, and any activated carbonyl compound (acyl COCl, etc.) can be employed. In one particular embodiment, the ion conductor, such as $LiFePO_4$, is suspended in an aqueous solution of a Monomer A (such as, m-pheynylenediamine). The suspension mixture of Monomer A and the $LiFePO_4$ is filtered through the polymer matrix (e.g., polyethylene/polypropylene substrate) at 40PSI. It should be appreciated that the pressure can be varied and with lower pressure preferred. A second monomer, Monomer B (such as 1,3,5-benzenetricarbonyl chloride) dissolved in organic solvents such as hexane, is then poured onto the polymer matrix having the Monomer A and $LiFePO_4$ mixture. The exposure of the monomer B is preferred to not be done by submersion, as it may lead to blockage of the Celgard® pores on the other side of the substrate. In one embodiment, pouring is done carefully and slowly so as to minimize perturbation of the compacted lithium ion conductors on the polymer matrix. The monomer A/monomer B technique utilizes interfacial polymerization (i.e., Monomers A and B react at the interface of the immiscible layers). Filtration of Monomer B is not recommended. Monomers A and B reacted to form a polyamide, the thickness of which is controlled by the monomer concentrations. The resulting polyamide thickness is minimized to not hinder lithium ion transport. Illustrated below is a schematic of a polyamide formation between an amine and an activated carbonyl compound.

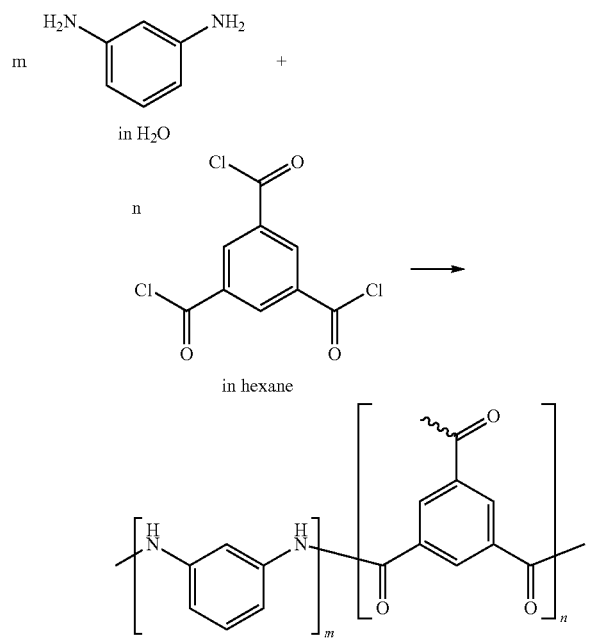

Thus, the ion conducting solids $LiFePO_4$ are encapsulated onto Celgard® by the thin polyamide layer.

In one embodiment, the resultant membrane can be treated after polymerization to ensure that the lithium ion conducting solid will be wet by the electrolyte, that is that it remains exposed on both sides of the membrane. An etchant or depolymerizating agent may be used to cleave the bond between the monomers, such as between Monomer A and Monomer B, to control thickness of the polymer layer. FIG. 13 illustrates the results of one embodiment using differing amounts of Pronase E where the m-phenylenediamine and a carbonyl compound 1,3,5-benzenetricarbonyl chloride were used as the monomers to polymerize around $LiFePO_4$.

Example

An experiment was carried out to create a lithium ion conducting membrane as described above. This experiment utilized bare Celgard® and polyamide-modified Celgard® membranes as controls with no lithium ion conducting solids. The tested embodiment of a membrane comprised polyamide+$LiFePO_4$+Celgard® membranes. The membranes were used in a setup similar to shown in FIG. 1 for electrodeposition of lithium. A pre-treated copper foil was used as the cathode. 1M $LiPF_6$ in DMC was used as the catholyte. The anode was platinum with the anolyte being saturated aqueous $Li_2SO_4$ with a pH of 3-4.

The electrodeposition was run for 40 minutes at $-2.5$ $mA/cm^2$. The results were observed as follows:
- (PP/PE/PP) membranes (Celgard®) only membrane: effervescence ($H_2$) off electrodeposited Li metal due to trace water through membrane
- (PP/PE/PP) membranes (Celgard®)/Polyamide membrane: no effervescence on Cu foil, minimal Li metal deposited
- (PP/PE/PP) membranes (Celgard®)/$LiFePO_4$/Polyamide membrane: no effervescence on electrodeposited Li metal.

The results show that the (PP/PE/PP) membranes (Celgard®)/Polyamide membrane fails to function to deposition lithium, at least an appreciable amount. In the experiment with just (PP/PE/PP) membranes (Celgard®), electrodeposition of lithium metal was still observed because the lithium ions in aqueous anolyte were still able to diffuse through the (PP/PE/PP) membranes (Celgard®) pores; however, this also meant that water was getting into the catholyte, and thus reacting with the electrodeposited lithium metal: $2\ Li_{(s)} + 2\ H_2O_{(liq)} \rightarrow 2\ LiOH + H_{2(gas)}$. There was no appreciable lithium metal electrodeposited using the (PP/PE/PP) membranes (Celgard®)/polyamide membrane since the nonporous polyamide sealed off the (PP/PE/PP) membranes (Celgard®) pores but without providing a means for lithium ion transport. Thus, the circuit between the half-cells was effectively open, large IR drop across the (PP/PE/PP) membranes (Celgard®)/polyamide membrane.

ALD/SIS Membrane

Figure 13A:
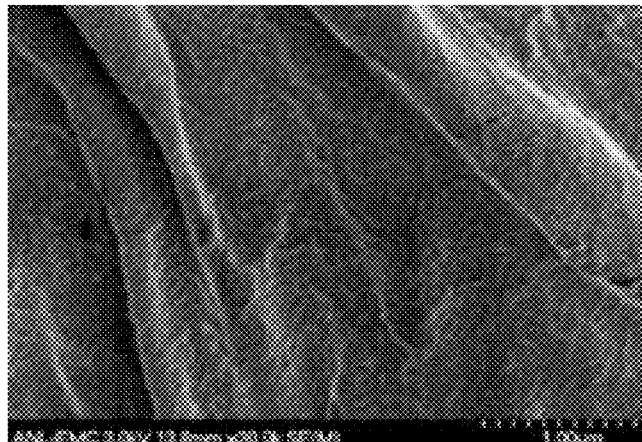
FIGS. 13A-C show photomicrograph images of one embodiment of an ALD coated hybrid membrane.
Figure 13B:
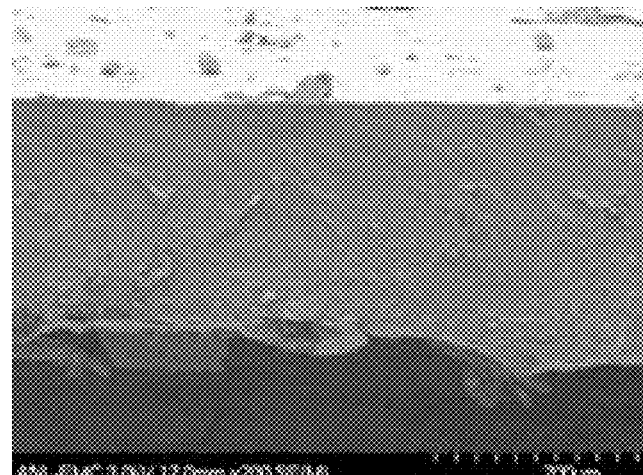
Figure 13C:
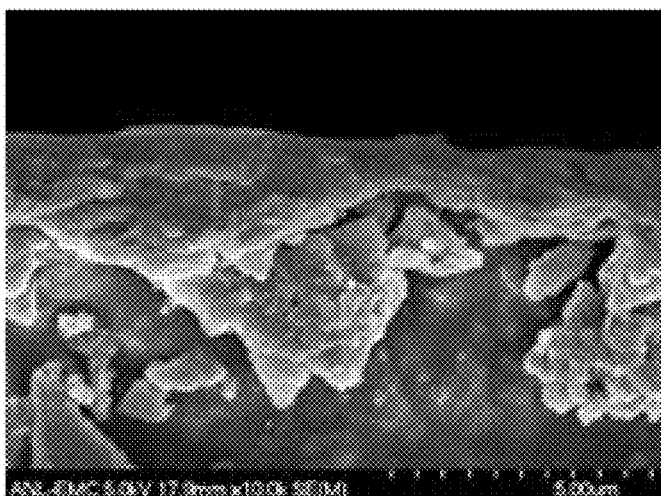

In another embodiment, the membrane is coated with an inorganic material on one or both sides, or deposited within the membrane's polymer domains, to minimize undesirable swelling upon immersion in both aqueous and organic media (FIGS. 13A-C). The membrane includes a polymer matrix and a lithium ion conducting material. The membrane may be PEO, as in the examples below, or other polymer materials described above, such as (PP/PE/PP) membranes (Celgard®). The inorganic material may be deposited by atomic layer deposition ("ALD") or sequential infiltration synthesis ("SIS"). In such embodiments, a lithium ion conducting material is embedded in a polymer film to form the membrane and one or more sides of the membrane are coated with the inorganic component. The inorganic material may be deposited to a thickness of 1 to 10,000 atoms, such as 1-2,000, 1-1,000, 1-100, 10-100, and 10-1000 atoms thick.

In one embodiment, the membranes are hybrid organic-inorganic composite membranes where inorganic components, such as oxide nanoparticles, are covalently networked by organic polymer (e.g., hydrocarbons such as PEO/PEG, polystyrenes, etc.) chains. Inorganic components that are lithium conducting can be used in one embodiment.

The membrane comprises a polymer framework. A layer of polymer material defines the membrane and the ion-conducting material is then embedded therein. The polymer should be selected based on the intended application, but in embodiments for use in the electrodeposition apparatus described, the polymer should be stable in both an aqueous environment and an organic, nonaqueous environment. Preferably, the polymer material will have a high dielectric stability to withstand the bias within the apparatus. The polymer may be silica-based polyurethane, a PEO polystyrene or polyamide. Polystyrene can provide enhanced rigidity compare to PEO of the same thickness; polyamide can provide enhanced stability in both aqueous and most organic solvents compared to PEO.

The lithium ion conducting material may be a suitable material that may be deposited by ALD/SIS. For example, $LiCoO_2$, $Li_{1+x+y}Al_xTi_{2-x}Si_yP_{3-y}O_{12}$. Alternatively, one can also incorporate inherent lithium ion conductors such as lithium iron phosphate ($LiFePO_4$), LTO, LCO, LLZO, and lithium versions of NASICON-type ceramics (e.g., Ohara LICG powders).

In a further embodiment, the inorganic components can be not inherently lithium-ion conducting that are doped to impart this property, such as silica, alumina, and titania. One way to achieve this is to introduce strongly bound (via electrostatic forces) lithium ions onto the negatively charged surfaces of silica nanoparticles via well-known techniques such as strong electrostatic attraction ("SEA") or by incipient wetness impregnation ("IWI"). These two techniques are widely used for loading metal sites for the synthesis of supported/heterogeneous catalysts. To the best of our knowledge, this is the first report of the use of SEA/IWI to prepare separators for battery applications. Alternatively, one can also incorporate inherent lithium ion conductors such as lithium iron phosphate ($LiFePO_4$), LTO, LCO, LLZO, and lithium versions of NASICON-type ceramics (e.g., Ohara LICG powders).

The ion-conducting aspect of the membrane may be imparted by one or both of having the ion conducting materials extend the thickness of the membrane, thus being exposed to both the cathode side catholyte and the anode side anolyte and/or ion hopping via lone pair donors on the polymer backbone. Lithium ion transport can be achieved through lithium ion conducting solids through a process called "vacancy diffusion" where the lithium ion moves from one point to another throughout the crystalline lattice. On the other hand, lithium ions are transported by non-lithium ion conductors via "hopping" mechanism where the positively charged lithium ion hops from one lone pair of electrons (electrostatic attraction) to another. These lone pair of electrons are typically on electronegative atoms such as F, O, or N on polymer backbones (the O atom in PEO/PEG, N atom in polyamides, or F in fluorinated polymers) or on oxide surfaces.

Once this hybrid organic inorganic membrane is prepared, the membrane is then subjected to an ALD/SIS treatment. Most ALD/SIS precursors employed react with hydroxyl/hydroxide (—OH) moiety that can be present either on the organic polymer network or on the surfaces of the embedded oxide particles, for example but not limited to ZnO, $ZrO_2$, $Al_2O_3$, $SiO_2$, $TiO_2$, $Li_2S$, $LiAlO_2$. Experiments included $Al_2O_3$ or ZnO coatings of uniform thickness on both sides of the hybrid organic-inorganic composite membrane from ALD/SIS precursors trimethylaluminum ("TMA") or diethylzinc ("DEZ"), respectively. Because these coatings are very thin (<5 nm on each side), they do not pose a barrier to lithium ion diffusion and transport from the electrolyte and through the membrane.

The coating may be done by a method chosen from ALD, Molecular Layer Deposition ("MLD"), and SIS.

Figure 12:
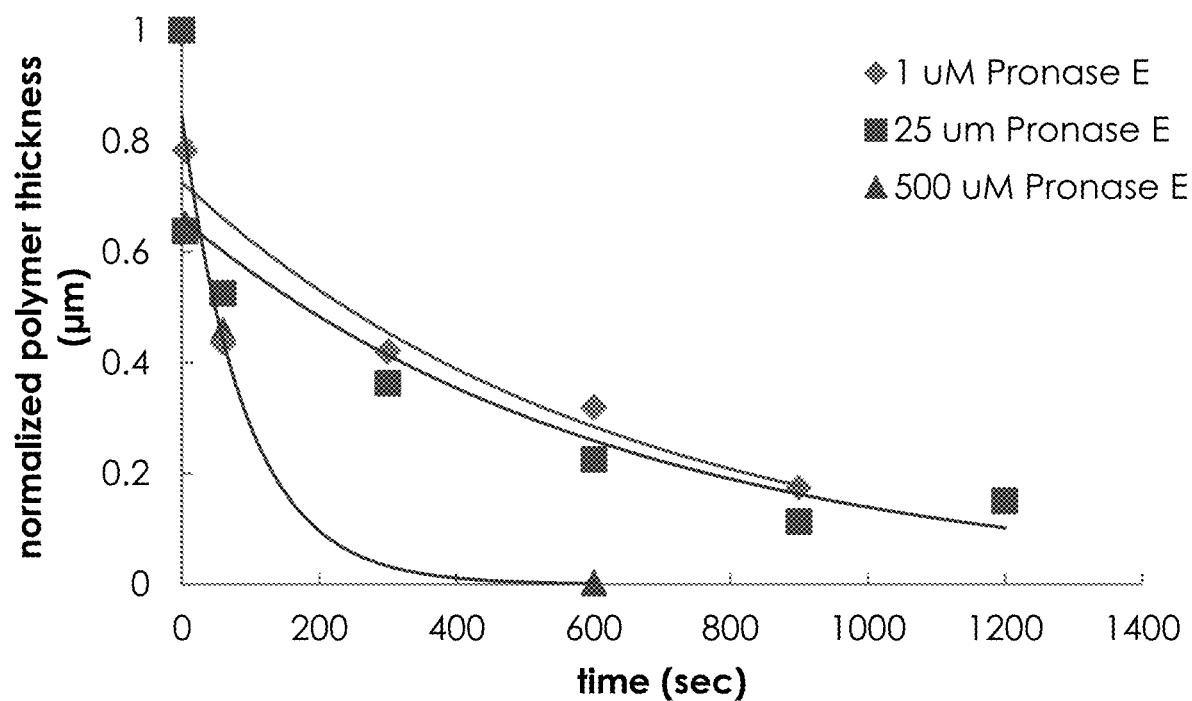
FIG. 12 is a graph of polymer thickness over time from exposure to three different concentrations of Pronase E.
Figure 14A:
FIGS. 14A-C shows an elemental analysis via X-ray fluorescence ("XREF") of one embodiment of a membrane (FIG. 14A) and of membranes fabricated by ALD/SIS treatment (FIGS. 14B-C). The XREF signal (y-axis) is plotted as a function of photon energy (x-axis, units keV).
Figure 14B:
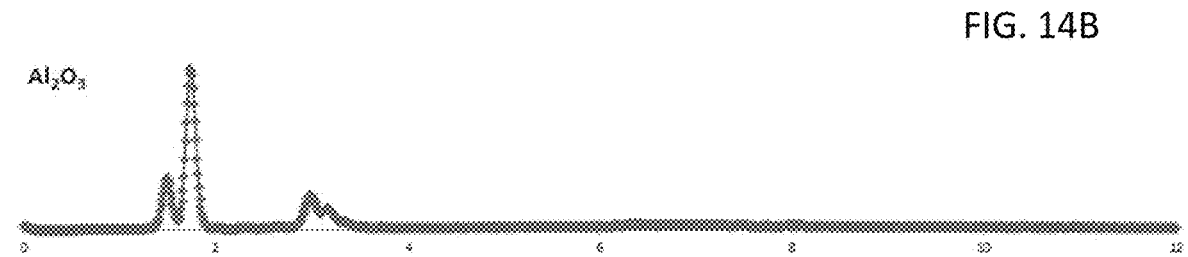
Figure 14C:
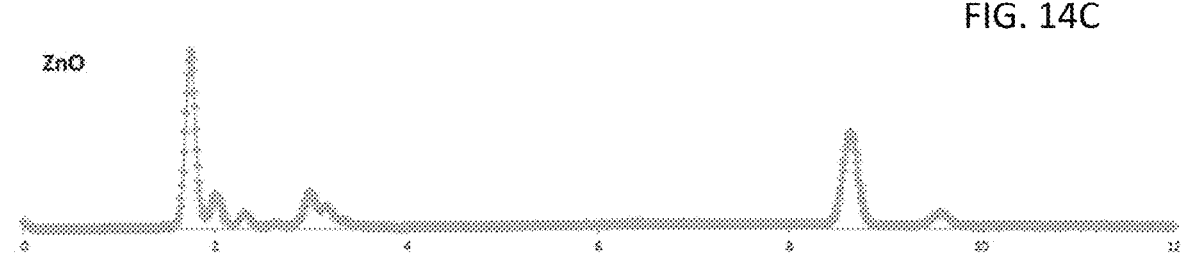
Figure 16A:
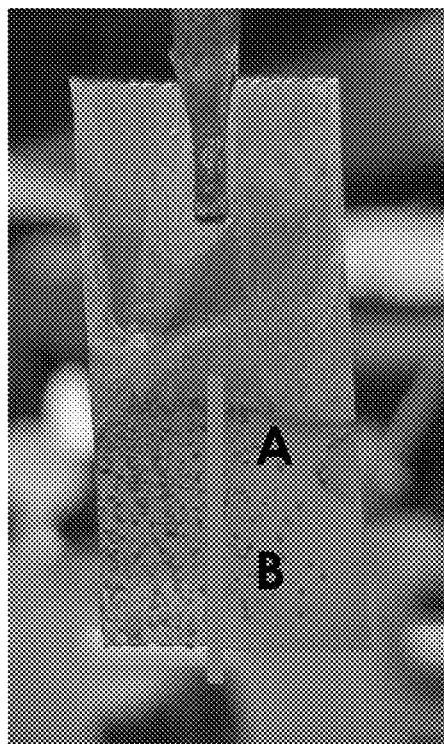
FIG. 16A illustrates a cathode with deposited lithium metal with an axis A-B.
Figure 16B:
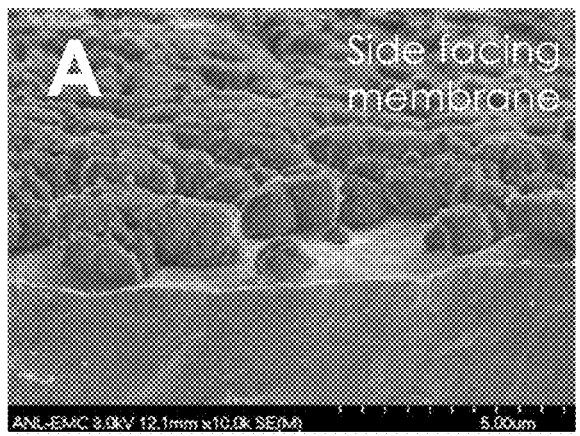
FIGS. 16B-C are micrographs of the cross section along A-B in FIG. 16A for the side of the cathode facing the membrane and nearest the atmosphere (argon)/catholyte interface.
Figure 16C:
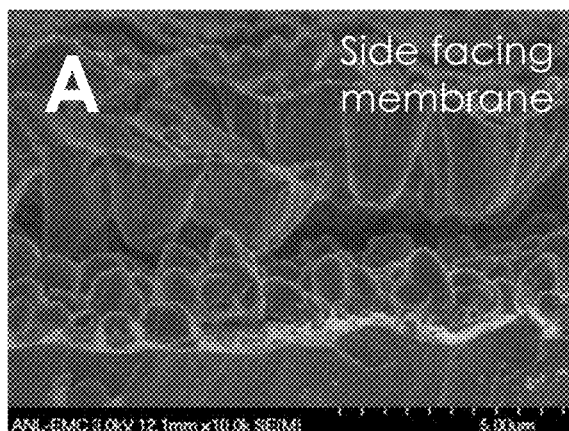
Figure 16D:
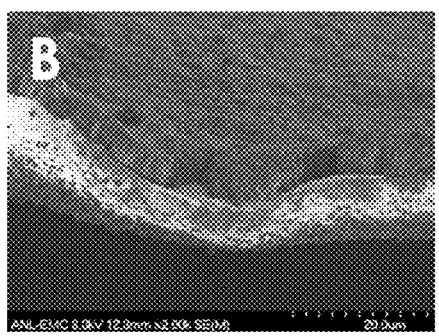
FIGS. 16D-H are micrographs of the cross section along A-B in FIG. 16A for the side of the cathode facing the membrane and furthest from the atmosphere (argon)/catholyte interface. Nanorod structure is observed most at the locations on the side facing the membrane and away from the atmosphere/catholyte interface.
Figure 16G:
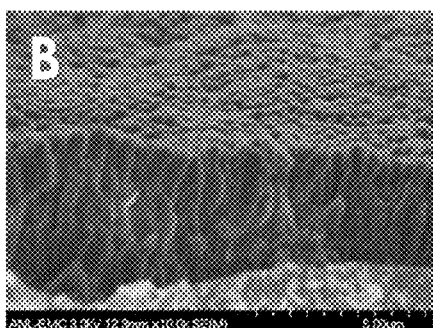
Figure 16E:
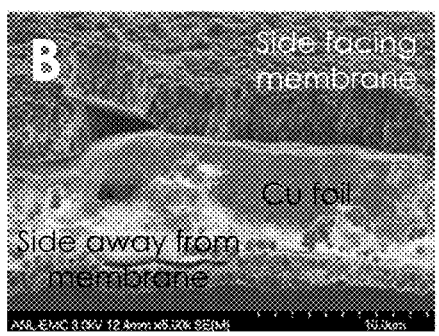
Figure 16H:
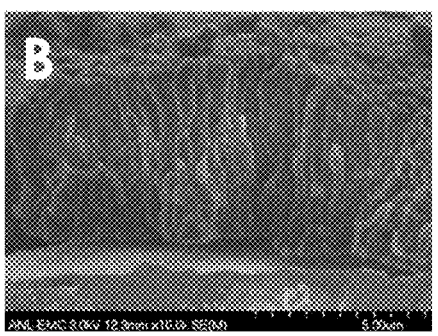
Figure 16F:
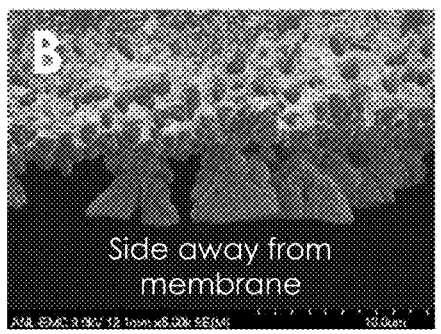

FIGS. 14A-C shows an elemental analysis via XREF of one embodiment of a membrane (FIG. 14A) and of membranes fabricated by ALD/SIS treatment (FIGS. 14B-C). The XREF signal (y-axis) is plotted as a function of photon energy (x-axis, units keV). FIG. 14A shows the untreated membrane; FIG. 14B shows a $TMA/H_2O$ treated membrane has been coated with aluminum oxide; FIG. 14C shows a $DEZ/H_2O$ treated membrane has been coated with zinc oxide. As seen in FIG. 14A, the elemental analysis of illustrates that the untreated membrane demonstrates the presence of silicon. This corresponds to the of silicon dioxide nanoparticles, and a corresponding major peak centered around ~1.8 keV (x-axis). Turning to the two samples treated by ALD/SIS treated membranes show identical signals in all but two regions. As seen in FIG. 12B, a $TMA/H_2O$ treated membrane has been coated with aluminum oxide, shows a peak centered around ~1.5 keV corresponding to aluminum. Further, FIG. 12C and (ii) $DEZ/H_2O$ treated membrane (green, bottom) has been coated with zinc oxide, and thus shows a peak centered around ~8.6 keV corresponding to zinc. Such data demonstrates that the membranes can be further functionalized via ALD and SIS, most notably to an even wider class of other coatings typically found in ALD/SIS processes.

Such data demonstrates that the membranes can be further functionalized via ALD and SIS, most notably to an even wider class of other coatings typically found in ALD/SIS processes. The ALD/SIS process can be used to alter additional properties of the membrane, for example hydrophobicity/hydrophilicity or current flow or ion permeability, as well as to tune wetting properties and dielectric stability. For example, a hydrophilic membrane such as PEO could be coated via ALD with a thin, ion permeable inorganic coating that reduces the hydrophilicity or changes the surface to be hydrophobic.

The coating of bare membrane material reduces the swelling observed in membrane materials. In particular, hydrophilic polymers such as PEO, polyelectrolytes such as polymethacrylic acid and polyamines will swell due in water or in polar organic solvents such as alkyl carbonates (dimethyl carbonate, ethyl methyl carbonate, propylene carbonate, ethylene carbonate). The reduced swelling improves the resistance of the treated membrane to water permeation compared to the bare membrane.

In one embodiment, an alumina overcoat is applied to a membrane and is sufficiently thin to allow ion transport through the overcoat. For example, 30 cycles of alumina to deposit a 4 nm thick overcoat, such as on one side or both sides of the membrane.

In another embodiment, zinc oxide overcoat is applied to a membrane and is sufficiently thin to allow ion transport through the overcoat. For example, 30 cycles of zinc oxide to deposit 4 nm thick overcoat, such as on one side or both sides of the membrane.

FIG. 15 illustrates one embodiment where thin film layers of $Al_2O_3$ are coated on a membrane, PEO and $SiO_2$ hybrid membrane in the illustrated embodiment.

In one particular example, a novel composite was prepared where commercially available lithium ion conducting powders (e.g., Ohara) is imparted with a thin silica overcoat via sol-gel methods, and the silica surfaces covalently modified with an oligomeric cross-linker. The oligomers on the silica surfaces then further react to form a network formed such as shown below using an isocyanate and an alcohol.

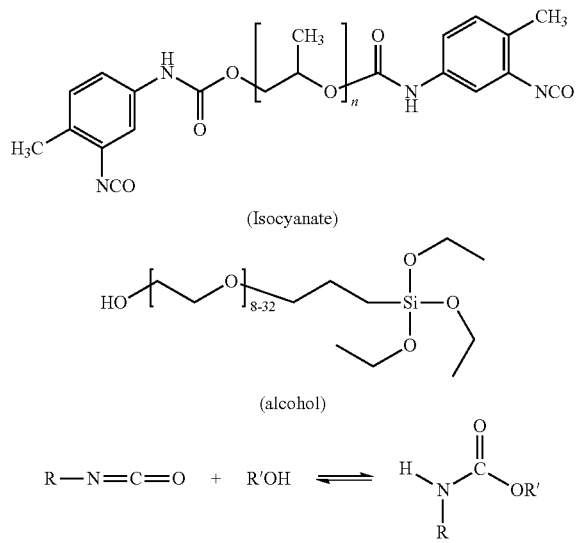

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for lithium metal synthesis comprising:
   a cathodic half-cell comprising:
      a cathode half-cell housing;
      a cathode electrode holder engaged with the cathodic half-cell housing;
      a cathode electrode engaged with the electrode holder; and
      a catholyte disposed within the cathode half-cell housing;
   an anodic half-cell comprising:
      an anode half-cell housing;
      an anode electrode holder engaged with the anodic half-cell housing;
      an anode electrode engaged with the electrode holder; and
      an anolyte disposed within the anodic half-cell housing; and
   an ion-permeable organic/inorganic hybrid membrane positioned between the cathodic half-cell and the anodic half-cell with cathodic side exposed to the catholyte and an anodic side exposed to the anolyte, the ion-permeable organic/inorganic hybrid membrane having a plurality of ion-conducting particles disposed within a polymeric matrix selected from the group consisting of polyethylene and polypropylene, and having lithium ions bound to the plurality of ion-conducting particles of the organic/inorganic membrane via electrostatic forces, the plurality of ion-conducting particles forming ion conducting channels in the polymeric matrix, the ion-permeable organic/inorganic hybrid membrane separating the anolyte from the catholyte and impermeable to both;
   wherein the cathodic half-cell is in electrical communication with the anodic half-cell by an electrical connection external to the cathodic half-cell and the anodic half-cell between the anode electrode and the cathode electrode configured for the flow of electrons.

2. The system of claim 1, wherein the cathode half-cell housing comprises glass and the anode half-cell housing comprises glass.

3. The system of claim 1 wherein the electrical connection further comprises a galvanostat positioned in electrical communication with the cathodic half-cell and the anodic half-cell and positioned there between.

4. The system of claim 1, wherein the cathodic half-cell is in fluid communication with a catholyte supply system.

5. The system of claim 1, wherein the anodic half-cell is in fluid communication with an anolyte supply system.

6. The system of claim 5, further comprising a peristaltic pump in communication with the anolyte supply system and configured to control flow of the anolyte.

7. The system of claim 1, wherein the catholyte comprises lithium salts dissolved in an organic solvent.

8. The system of claim 1, wherein the anolyte comprises an aqueous solution of lithium salts.

9. The system of claim 1, wherein the anode comprises platinum or platinum-coated substrates.

10. A system for lithium metal synthesis comprising:
a cathodic half-cell comprising:
   a cathode half-cell housing;
   a cathode electrode holder engaged with the cathodic half-cell housing;
   a cathode electrode engaged with the electrode holder; and
   a catholyte disposed within the cathode half-cell housing;
an anodic half-cell comprising:
   an anode half-cell housing;
   an anode electrode holder engaged with the anodic half-cell housing;
   an anode electrode engaged with the electrode holder; and
   an anolyte disposed within the anodic half-cell housing; and
an ion-permeable membrane comprising:
   a polymeric matrix;
   a plurality of ion-conducting particles having lithium bound thereto via electrostatic forces, the plurality of ion-conducting particles disposed within the polymeric matric, the plurality of ion-conducting particles forming ion conducting channels in the polymeric matrix;
   a plurality of ion-conducting particles deposited within the polymeric matrix, the plurality of ion-conducting particles having lithium ions bound thereto via electrostatic forces;
the ion-permeable membrane positioned between the cathodic half-cell and the anodic half-cell with cathodic side exposed to the catholyte and an anodic side exposed to the anolyte, the ion-permeable membrane separating the anolyte from the catholyte and impermeable to both;
wherein the cathodic half-cell is in electrical communication with the anodic half-cell by an electrical connection external to the cathodic half-cell and the anodic half-cell between the anode electrode and the cathode electrode configured for the flow of electrons.

11. The system of claim 10, wherein the cathode half-cell housing comprises glass and the anode half-cell housing comprises glass.

12. The system of claim 10 wherein the electrical connection further comprises a galvanostat positioned in electrical communication with the cathodic half-cell and the anodic half-cell and positioned there between.

13. The system of claim 10, wherein the cathodic half-cell is in fluid communication with a catholyte supply system.

14. The system of claim 10, wherein the anodic half-cell is in fluid communication with an anolyte supply system.

15. The system of claim 10, further comprising a peristaltic pump in communication with the anolyte supply system and configured to control flow of the anolyte.

16. The system of claim 10, wherein the catholyte comprises lithium salts dissolved in an organic solvent.

17. The system of claim 10, wherein the anolyte comprises an aqueous solution of lithium salts.

18. The system of claim 10, wherein the anode comprises platinum or platinum-coated substrates.

* * * * *